US011853269B2

(12) United States Patent
Hsieh et al.

(10) Patent No.: US 11,853,269 B2
(45) Date of Patent: Dec. 26, 2023

(54) SYSTEMS AND METHODS FOR INCREASING DATABASE ACCESS CONCURRENCY

(71) Applicant: Google LLC, Mountain View, CA (US)

(72) Inventors: Wilson Cheng-Yi Hsieh, Syosset, NY (US); Alexander Lloyd, New York, NY (US); Eric Hugh Veach, Bellevue, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/824,348

(22) Filed: May 25, 2022

(65) Prior Publication Data

US 2022/0398227 A1    Dec. 15, 2022

Related U.S. Application Data

(63) Continuation of application No. 16/730,095, filed on Dec. 30, 2019, now Pat. No. 11,372,825, which is a
(Continued)

(51) Int. Cl.
*G06F 16/21*      (2019.01)
*G06F 16/23*      (2019.01)

(52) U.S. Cl.
CPC ........ *G06F 16/211* (2019.01); *G06F 16/2322* (2019.01); *G06F 16/2329* (2019.01)

(58) Field of Classification Search
CPC . G06F 16/211; G06F 16/2322; G06F 16/2329
(Continued)

(56) References Cited

U.S. PATENT DOCUMENTS 5,333,315 A    7/1994 Saether et al.
5,421,007 A    5/1995 Coleman et al.
(Continued)

FOREIGN PATENT DOCUMENTS

CN    101001148 A    7/2007
CN    101316274 B    12/2010
(Continued)

OTHER PUBLICATIONS

Bernstein, Chapter 5-Multiversion Concurrency Control, Concurrency Control and Recovery in Database Systems, Jan. 1, 1987, 24 pgs.
(Continued)

*Primary Examiner* — Michael Pham
(74) *Attorney, Agent, or Firm* — Lerner David LLP

(57) ABSTRACT

The various embodiments described herein include methods, devices, and systems for reading and writing data from a database table. In one aspect, a method includes: (1) initiating a read transaction to read from a first non-key column of a row in the database table, the database table having a plurality of rows, each row comprising a primary key and a plurality of non-key columns, the initiating including: (a) determining that a write transaction holds a lock on a second non-key column of the row in the database table, and (b) determining that no lock is held on the first non-key column; and (2) in response, concurrently reading data from the first non-key column and writing a new column value to the second non-key column; where each non-key column includes a last-write timestamp that indicates when the last write occurred for the respective non-key column.

18 Claims, 20 Drawing Sheets

Related U.S. Application Data continuation of application No. 15/665,273, filed on Jul. 31, 2017, now Pat. No. 10,558,625, which is a continuation of application No. 13/909,928, filed on Jun. 4, 2013, now Pat. No. 9,747,310.

(60) Provisional application No. 61/655,973, filed on Jun. 5, 2012, provisional application No. 61/655,438, filed on Jun. 4, 2012.

(58) Field of Classification Search
USPC .......................................................... 707/803
See application file for complete search history.

(56) References Cited

U.S. PATENT DOCUMENTS

| | | |
|---|---|---|
| 5,832,521 A | 11/1998 | Klots et al. |
| 6,477,544 B1 | 11/2002 | Bolosky et al. |
| 6,772,155 B1 | 8/2004 | Stegelmann |
| 6,963,914 B1 | 11/2005 | Breitbart et al. |
| 6,981,114 B1 | 12/2005 | Wu |
| 7,065,618 B1 | 6/2006 | Ghemawat et al. |
| 7,334,004 B2 | 2/2008 | Ganesh et al. |
| 7,363,326 B2 | 4/2008 | Margolus |
| 7,430,570 B1 | 9/2008 | Srinivasan et al. |
| 7,567,973 B1 | 7/2009 | Burrows et al. |
| 7,774,469 B2 | 8/2010 | Massa et al. |
| 8,627,135 B2 | 1/2014 | Aron et al. |
| 8,719,432 B1 | 5/2014 | Vermeulen et al. |
| 8,806,323 B2 | 8/2014 | Samavedula |
| 8,838,539 B1 | 9/2014 | Ashcraft et al. |
| 8,850,130 B1 | 9/2014 | Aron et al. |
| 8,949,208 B1 | 2/2015 | Xu et al. |
| 9,678,968 B1 | 6/2017 | Taylor |
| 2002/0133507 A1 | 9/2002 | Holenstein et al. |
| 2002/0178249 A1 | 11/2002 | Prabakaran et al. |
| 2003/0065708 A1 | 4/2003 | Jacobs et al. |
| 2003/0132855 A1 | 7/2003 | Swan |
| 2004/0205066 A1 | 10/2004 | Bhattacharjee et al. |
| 2004/0236746 A1 | 11/2004 | Lomet |
| 2005/0015404 A1 | 1/2005 | Cherkasova |
| 2005/0066118 A1 | 3/2005 | Perry |
| 2005/0149627 A1 | 7/2005 | Schreter |
| 2005/0177590 A1 | 8/2005 | Chen et al. |
| 2005/0192991 A1 | 9/2005 | Nomoto |
| 2005/0210218 A1 | 9/2005 | Hoogterp |
| 2006/0047895 A1 | 3/2006 | Rowan |
| 2007/0016546 A1 | 1/2007 | De Vorchik et al. |
| 2007/0050429 A1 | 3/2007 | Goldring et al. |
| 2007/0183224 A1 | 8/2007 | Erofeev |
| 2007/0219999 A1 | 9/2007 | Richey et al. |
| 2008/0071853 A1 | 3/2008 | Mosler et al. |
| 2008/0096662 A1 | 4/2008 | Kuwahara et al. |
| 2008/0133616 A1 | 6/2008 | Willoughby |
| 2008/0201366 A1 | 8/2008 | Devarakonda |
| 2008/0243879 A1 | 10/2008 | Gokhale et al. |
| 2008/0250072 A1 | 10/2008 | Nguyen |
| 2008/0263305 A1 | 10/2008 | Shu et al. |
| 2009/0070330 A1 | 3/2009 | Hwang et al. |
| 2009/0327642 A1 | 12/2009 | Ogihara et al. |
| 2010/0023520 A1 | 1/2010 | Barboy et al. |
| 2010/0077165 A1 | 3/2010 | Lu et al. |
| 2010/0281013 A1 | 11/2010 | Graefe |
| 2011/0029498 A1 | 2/2011 | Ferguson et al. |
| 2011/0196664 A1 | 8/2011 | Zunger et al. |
| 2012/0036161 A1 | 2/2012 | Lacapra et al. |
| 2012/0151272 A1 | 6/2012 | Behrendt et al. |
| 2012/0159102 A1 | 6/2012 | Kan |
| 2012/0303791 A1 | 11/2012 | Calder et al. |
| 2013/0060742 A1 | 3/2013 | Chang et al. |
| 2013/0110774 A1 | 5/2013 | Shah et al. |
| 2013/0204991 A1 | 8/2013 | Skjolsvold et al. |
| 2013/0318129 A1 | 11/2013 | Vingralek et al. |
| 2013/0346365 A1 | 12/2013 | Kan et al. |
| 2014/0007239 A1 | 1/2014 | Sharpe et al. |
| 2015/0012497 A1 | 1/2015 | Clark et al. |

FOREIGN PATENT DOCUMENTS

| | | |
|---|---|---|
| CN | 101854392 B | 11/2012 |
| WO | 2011100366 A2 | 8/2011 |
| WO | 2012040391 A1 | 3/2012 |

OTHER PUBLICATIONS

Cahill, Seriallizable Isolation for Snapshot Databases, Jun. 9-12, 2008, 10 pgs.

Chang, Fay et. al. "Bigtable: A Distributed Storage System for Structured data". Nov. 2006. Google. http://research.google.com/archive/bigtable.html. pp. 1-14.

Elmasri, Chapter 20—Physical Database Design and Tuning, Fundamentals of Database Systems, 6th Ed., Addison-Wesley, Jan. 1, 2011, 16 pgs.

Ferro, A Critique of Snapshot Isolation, Yahoo Research, Apr. 10-13, 2012, 14 pgs.

Garcia-Molina, Chapter 18—Concurrency Control, Database Systems: The Complete Book, Prentice-Hall, Jan. 1, 2002, 72 pgs.

Garcia-Molina, Chapter 1—The Worlds of Database Systems, Database Systems: The Complete Book, Prentice Hall, Jan. 1, 2002, 21 pgs.

Ghemawat, The Google File System, Proc. of the ACM Symposium on Operating Systems Principles, Oct. 19, 2003, pp. 1-15.

Google Inc., International Preliminary Report on Patentability, PCT/US2013/044105, dated Dec. 9, 2014, 4 pgs.

Google Inc., International Preliminary Report on Patentability, PCT/US2013/044163, dated Dec. 9, 2014, 9 pgs.

Google Inc., International Search Report and Written Opinion, PCT/US2013/044163, dated May 9, 2014, 11 pgs.

Google Inc., Invitation to Pay Additional Fees, PCT/US2013/042063, dated Jul. 30, 2013, 8 pgs.

International Search Report and Written Opinion dated Dec. 13, 2013, received in International Application No. PCT/US2013/042063, which corresponds to U.S. Appl. No. 13/898,411, 17 pages (Jeffrey Adgate Dean).

International Search Report and Written Opinion dated Nov. 14, 2013, received in International Application No. PCT/US2013/044105, which corresponds to U.S. Appl. No. 13/909,021, 7 pages (Yasushi Saito).

Ivanova, Self-Organizing Strategies for a Column-Store Database, Proc. of the 11th International Conference on Extending Database Technology Advances in Database Technology, EDBT'08, Mar. 25, 2008, pp. 157-168.

Notification of First Office Action 201380037792.3, dated Sep. 28, 2016, 11 pgs.

Summons to Attend Oral Proceedings for European Patent Application No. 13730730.2 dated Jul. 31, 2019. 10 pages.

Thomson, Calvin: Fast Distributed Transactions for Partitioned Database Systems, May 20-24, 2012, 12 pgs.

Zhang, Supporting Multi-Row Distributed Transactions with Global Snapshot Isolation Using Bare-Bones Hbase, 11th IEEE/ACM Int'l Conf. on Grid Computing, Piscataway, NJ, Oct. 25, 2010, pp. 177-184.

Database Table 1200

Figure 12A

| 1202 Customer ID | 1204 Last Name | 1206 First Name | 1208 Address | 1210 City | 1212 State | 1214 Orders |
|---|---|---|---|---|---|---|
| 454928806 | Value(s) | Value(s) | Value(s) | Value(s) | Value(s) | Subtable |
| 312257018 | Value(s) | Value(s) | Value(s) | Value(s) | Value(s) | Subtable |

1216, 1218, 1220, 1222, 1224

Address Values for Customer 312257018

| 1226 Address Timestamp | 1228 Address Value |
|---|---|
| 2009-01-02 13:12:21.5723 | 123 Main St. |
| 2011-09-15 18:15:53.0217 | 2388 First St. #12 |
| 2013-12-22 08:43:29.8293 | 9178 Sunset Avenue |

Orders Subtable for Customer 312257018

| 1250 Order ID | 1252 Order Date | 1254 Shipping Address | 1256 Order Items |
|---|---|---|---|
| AB0032117 | Value(s) | Value(s) | Subtable |
| QA1997233 | Value(s) | Value(s) | Subtable |

Items Subtable for Order QA1997233

| 1270 Item ID | 1272 Quantity | 1274 Price |
|---|---|---|
| 3815-90098 | Value(s) | Value(s) |
| 7752-81517 | Value(s) | Value(s) |

| 1202 ↘ Customer ID | 1306 ↘ [First Name] Last Write | 1308 ↘ [Address] Last Write | |
|---|---|---|---|
| 312257018 | 2009-01-02 13:12:21.5723 | 2013-12-22 08:43:29.8293 | ... |

Minimum Next New Write Timestamp (MNNWT)

| 2014-03-15 21;12:49.4375 |
|---|

1320

Write Transaction 1400

Read Transaction 1450

SYSTEMS AND METHODS FOR INCREASING DATABASE ACCESS CONCURRENCY

RELATED APPLICATIONS

This application is a continuation of U.S. application Ser. No. 16/730,095, filed Dec. 30, 2019, which is a continuation of U.S. application Ser. No. 15/665,273, filed Jul. 31, 2017, which is a continuation of U.S. application Ser. No. 13/909,928, filed Jun. 4, 2013, entitled "Systems and Methods of Increasing Database Access Concurrency Using Granular Timestamps," which claims priority to U.S. Provisional Application Ser. No. 61/655,438, filed Jun. 4, 2012, entitled "Systems and Methods of Increasing Database Access Concurrency Using Granular Timestamps," and U.S. Provisional Application Ser. No. 61/655,973, filed Jun. 5, 2012, entitled "Systems and Methods of Increasing Database Access Concurrency Using Granular Timestamps," both of which are incorporated by reference herein in their entirety.

TECHNICAL FIELD

The disclosed embodiments relate generally to database management systems and more specifically to increasing database access concurrency.

BACKGROUND

Each item (e.g., column) in a multiversion database is versioned and stored at a server-assigned timestamp. Old versions of an item can be read, but are typically subject to garbage-collection limits. Timestamps are causally consistent so that reads of data at old timestamps are guaranteed to reflect a causally consistent view of the database. For example, if transaction T1 completes before transaction T2 starts, then the timestamp of T1 must be less than the timestamp of T2, even if the transactions are on separate machines and do not overlap in terms of the data they access. Moreover, transaction T2 is guaranteed to "see" the effects of T1, and any transaction that "sees" T2 will also see T1.

When a client reads data from a multiversion database, the read can either specify a timestamp or allow the database management system to select the read timestamp within a specified bound on staleness. Selecting a timestamp within a staleness bound requires locking and/or blocking in order to prevent ambiguous staleness calculations.

Previously, multiversion databases enabled the calculation of read timestamps by tracking the last time any change was made to a row of data. However, when the database tracks only the last time each row was modified, the algorithm for selecting a read timestamp must select a timestamp that is greater than the last time that any column for the row has changed. This artificially high lower bound on selecting timestamps can slow down or block reads unnecessarily. It therefore limits concurrent access to a single row.

In some embodiments, a multiversion database comprises a single replica, which is typically stored at a single geographical location. In other embodiments, a multiversion database is distributed to two or more replicas, which are typically stored at two or more distinct geographic locations. When a database is distributed across multiple machines, disclosed embodiments generally utilize some distributed time system. For databases that are distributed, it is important for the timestamps to be consistent across multiple servers at multiple locations in order to provide unique event ordering. However, clocks in a distributed system are not always synchronized. One way of obtaining synchronized timestamps is with a network time protocol (NTP) service. By using a NTP service, clients may attempt to synchronize themselves by periodically querying a time master that may respond with a timestamp packet. The time queries and responses from the time master may allow a client to estimate its clock phase and frequency error, and adjust clock rates accordingly.

Several forms of uncertainty may afflict such query-based measurements. For example, delays induced by scheduling, network congestion, interrupt coalescing, routing asymmetry, system overloads, and other causes can prove to be as unpredictable as they are asymmetric. Moreover, a typical NTP's notion of time synchronization may be fundamentally flawed because no master can be entirely trustworthy. Thus, it may be prudent for clients not to make time adjustments based solely on a single master's response.

SUMMARY OF THE INVENTION

Disclosed embodiments increase the parallelism between database reads and writes by maintaining more granular data on when objects were last modified. Rather than keeping a per-row or per-shard record of last-timestamp-written, disclosed embodiments keep track of the last-timestamp written for each object (e.g., column or field within a row). Because of this detail, read timestamps can be selected and reads can proceed without being blocked by concurrent writes as long as the ongoing write does not have locks on the specific objects required by the read operation.

In accordance with some embodiments, a computer-implemented method executes at one or more server systems, each with one or more processors and memory. The memory stores one or more programs for execution by the one or more processors. The programs include instructions for reading and writing data from a database table that has a plurality of rows. Each row in the database table has a primary key and a plurality of non-key columns. Each non-key column has one or more column values, and each column value has an associated timestamp that identifies when the associated column value was stored. The timestamps associated with the column values in each non-key column provide a unique order for the column values that comprise the non-key column. In accordance with some embodiments, the method initiates a read transaction to read from a first non-key column of a first row in the database table. The method determines that a write transaction is in progress that is updating a second non-key column of the first row in the database table, where the second non-key column is distinct from the first non-key column. The write transaction holds a lock on the second non-key column of the first row of the database table. The method concurrently reads the data from the first non-key column and writes a new column value to the second non-key column.

In accordance with some embodiments, each non-key column includes a last-write timestamp that indicates when the last write occurred for the respective non-key column. In some embodiments, initiating the read transaction includes selecting a read timestamp based in part on the last-write timestamp of the first non-key column. In some implementations, reading the data from the first non-key column includes selecting a column value from the first non-key column corresponding to the read timestamp. In some embodiments, the read timestamp is selected that is both greater than the last-write timestamp of the first non-key column and less than a value designated as the minimum next new write timestamp for the database table. When reading a plurality of non-key columns, the read timestamp is selected that is greater than the last-write timestamp for all of the columns being read (and less than the value designated as the minimum next new write timestamp for the database table).

In accordance with some embodiments, the method stores, for each non-key column of each row, a last-write timestamp that indicates when the last write occurred for the respective non-key column of the respective row. In some embodiments, the last-write timestamp for each non-key column is stored separately from the non-key column values. In some embodiments, initiating the read transaction includes selecting a read timestamp based in part on the last-write timestamp of the first non-key column. In some embodiments, reading the data from the first non-key column includes selecting a column value from the first non-key column corresponding to the read timestamp. In some embodiments, a read timestamp is selected that is both greater than the last-write timestamp of the first non-key column and less than a value designated as the minimum next new write timestamp for the database table. When reading a plurality of non-key columns, the read timestamp is selected that is greater than the last-write timestamp for all of the columns being read (and less than the value designated as the minimum next new write timestamp for the database table).

In accordance with some embodiments, a computer-implemented method executes at one or more server systems, each with one or more processors and memory. The memory stores one or more programs for execution by the one or more processors. The programs include instructions for reading and writing data from a database. The method includes creating a database table that has a plurality of rows. Each row has a primary key and a plurality of non-key columns. Each non-key column has one or more column values, each having an associated timestamp. The timestamp associated with a column value identifies when the column value was stored. Accordingly, the timestamps associated with the column values in each non-key column provide a unique order for the column values that comprise the non-key column. In some embodiments, the method stores, for each non-key column of each row, a last-write timestamp that indicates when the last write occurred for the respective non-key column of the respective row. The method includes initiating a read transaction to read from a first non-key column of a first row in the database table. In some instances, initiating the read transaction includes determining that a write transaction is in progress that is updating a second non-key column of the first row in the database table, where the second non-key column is distinct from the first non-key column. In some embodiments, initiating the read transaction further comprises selecting a read timestamp based in part on the last-write timestamp of the first non-key column. The write transaction holds a lock on the second non-key column of the first row of the database table, but the method concurrently reads the data from the first non-key column and writes a new column value to the second non-key column. In some embodiments, reading the data from the first non-key column comprises selecting a column value from the first non-key column corresponding to the read timestamp.

In accordance with some embodiments, a computer-implemented method executes at one or more server systems, each with one or more processors and memory. The memory stores one or more programs for execution by the one or more processors. The programs include instructions for reading and writing data from a database. The method includes creating a database table that has a plurality of rows. Each row has a primary key and a plurality of non-key columns. Each non-key column has one or more column values, each having an associated timestamp. The timestamp associated with a column value identifies when the column value was stored. Accordingly, the timestamps associated with the column values in each non-key column provide a unique order for the column values that comprise the non-key column. The method includes initiating a write transaction to update a first row in the database table, which includes placing a lock on a first non-key column of the first row. Prior to completion of the write transaction, the method initiates a read transaction to read from a second non-key column of the first row in the database table. The second non-key column is distinct from the first non-key column. The first transaction and the second transaction execute at the same time, operating on distinct columns of the same row. Completing the write transaction includes selecting a first timestamp that is greater than the timestamps associated with existing column values for the first non-key column of the first row, and inserting a new column value into the first non-key column of the first row of the database table. The new column value is associated with the first timestamp.

In accordance with some embodiments, a database management system includes one or more server systems, each with one or more processors and memory. The memory stores one or more programs for execution by the one or more processors. The programs include instructions for reading and writing data from a database. The database management system creates a database table that has a plurality of rows. Each row has a primary key and a plurality of non-key columns. Each non-key column has one or more column values, each having an associated timestamp. The timestamp associated with a column value identifies when the column value was stored. Accordingly, the timestamps associated with the column values in each non-key column provide a unique order for the column values that comprise the non-key column. The database management system initiates a write transaction to update a first row in the database table, which includes placing a lock on a first non-key column of the first row. Prior to completion of the write transaction, the database management system initiates a read transaction to read from a second non-key column of the first row in the database table. The second non-key column is distinct from the first non-key column. The first transaction and the second transaction execute at the same time, operating on distinct columns of the same row. The database management system completes the write transaction by selecting a first timestamp that is greater than the timestamps associated with existing column values for the first non-key column of the first row, and inserting a new column value into the first non-key column of the first row of the database table. The new column value is associated with the first timestamp.

In accordance with some embodiments, a computer readable storage medium stores one or more programs configured for execution by one or more server computers in a database management system, each server computer having one or more processors and memory storing one or more programs for execution by the one or more processors, the one or more programs comprising instructions for reading and writing data from a database. The computer readable storage medium includes instructions to create a database table that has a plurality of rows. Each row has a primary key and a plurality of non-key columns. Each non-key column has one or more column values, each having an associated timestamp. The timestamp associated with a column value identifies when the column value was stored. Accordingly, the timestamps associated with the column values in each non-key column provide a unique order for the column values that comprise the non-key column. The computer readable storage medium includes instructions to initiate a write transaction to update a first row in the database table, which includes placing a lock on a first non-key column of the first row. The computer readable storage medium includes instructions that are configured to execute prior to completion of the write transaction, which initiate a read transaction to read from a second non-key column of the first row in the database table. The second non-key column is distinct from the first non-key column. The instructions included in the computer readable storage medium are configured to execute the first transaction and the second transaction at the same time, operating on distinct columns of the same row. The computer readable storage medium includes instructions to complete the write transaction by selecting a first timestamp that is greater than the timestamps associated with existing column values for the first non-key column of the first row, and inserting a new column value into the first non-key column of the first row of the database table. The new column value is associated with the first timestamp.

Embodiments of a multiversion database that track last-timestamp-written for individual objects are thus able to increase concurrent access to distinct objects within a single row of a database table. When a multiversion database exists as a single replica and/or comprises data storage at a single geographic location, the disclosure herein to provide globally synchronized timestamps is typically not used. As described in greater detail below, the timestamps must be monotonically increasing in order for the timestamps to provide a causally consistent view of the data, but there is no inherent reason for the timestamps in one database to be synchronized with the timestamps for another unrelated database.

Other aspects of this disclosure may be advantageous for generating globally synchronized timestamps without incurring various types of network uncertainty inherent in explicit synchronization. The globally synchronized timestamps can be used by various services, e.g., to validate local timestamps and clocks, or to provide causality-respecting timestamps for database updates. By introducing techniques to track, calculate and record time data relative to a number of reliable time references, an easy-to-manage and low-cost time base may be provided for host machines in a distributed system.

One aspect of the disclosure provides a method that includes receiving an initial local timestamp, receiving reference timestamps transmitted from a plurality of time references, determining transmission delays associated with the time references, and calculating, using a processor, time offset intervals corresponding to the time references. Each time offset interval includes a set of time offsets that represent differences between a given reference timestamp and the initial local timestamp. In this regard, the set of time offsets compensate for the transmission delay associated with the corresponding time reference. The method also includes selecting at least one of the time offset intervals based on an occurrence of that time offset interval among the calculated time offset intervals. In one example, the selected time offset interval has a highest occurrence among the calculated time offset intervals. In another example, determining transmission delays includes estimating an amount of time associated with receiving reference timestamps from a given time reference. The method may also include determining a timing error in local timestamps generated based on a local clock by comparing the local timestamps to the reference timestamps, and adjusting the local timestamps with the time offsets from the selected time offset interval. In one example, adjusting the local timestamps includes waiting for a period of time to pass.

Another aspect of the disclosure provides a system that includes a memory, a local clock, a receiver module adapted to receive reference timestamps from a plurality of time references, and a processor coupled to the memory. The processor may be configured to receive an initial local timestamp based on the local clock, register in memory reference timestamps received by the receiver module, determine transmission delays associated with the time references, and calculate time offset intervals corresponding to the time references. Each time offset interval includes a set of time offsets that represent differences between a given reference timestamp and the initial local timestamp. In this regard, the set of time offsets compensates for the transmission delay associated with the corresponding time reference. The processor is also configured to select at least one of the time offset intervals based on an occurrence of that time offset interval among the calculated time offset intervals.

Yet another aspect of the disclosure provides a tangible, computer-readable storage medium that includes instructions that, when executed by a processor, cause the processor to perform a method. The method includes receiving an initial local timestamp, receiving reference timestamps transmitted from a plurality of time references, determining transmission delays associated with the time references, and calculating, using a processor, time offset intervals corresponding to the time references. Each time offset interval includes a set of time offsets that represent differences between a given reference timestamp and the initial local timestamp. In this regard, the set of time offsets compensates for the transmission delay associated with the corresponding time reference. The method also includes selecting at least one of the time offset intervals based on an occurrence of that time offset interval among the calculated time offset intervals.

BRIEF DESCRIPTION OF THE DRAWINGS

FIGS. 12A-12D illustrate exemplary data structures used in a multiversion database in accordance with some embodiments.

FIGS. 13A-13B illustrate data that is used by a multiversion database to assign read timestamps and write timestamps in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings.

Some of the disclosed embodiments of a database management system use a distributed time system when the database is distributed across multiple machines. FIGS. 1-8 illustrate one example of a distributed time system that can be used in conjunction with the database management system illustrated in FIGS. 9-16B. Some embodiments of the database management system illustrated in FIGS. 9-16B utilize alternative distributed time systems.

In this disclosure, systems and methods are provided for generating globally coherent timestamps. This technology may allow distributed systems to causally order transactions without incurring various types of communication delays inherent in explicit synchronization. By globally deploying a number of time masters that are based on various types of time references (e.g., Global Positioning Systems (GPS) and atomic clocks), the masters may serve as primary time references for the distributed systems. Techniques described herein may be used to request, track, calculate and record data relative to each time master. This data can be cross checked against a number of time masters in order to assess which time masters may be malfunctioning and which time masters may provide validated causal timestamps to clients.

Figure 1:
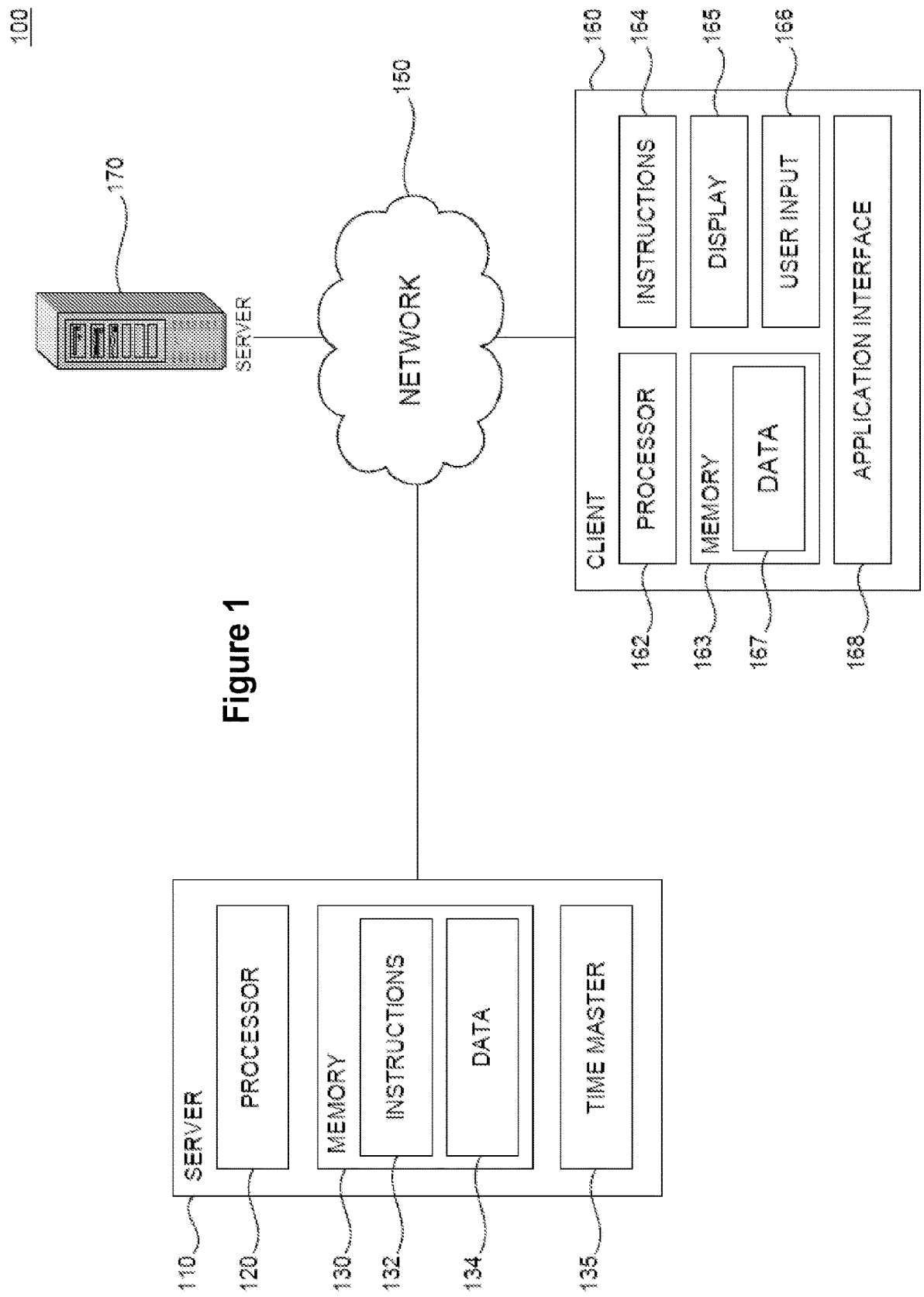
FIG. 1 is a diagram of a system according to aspects of the present technology.

FIG. 1 is a diagram of a system 100 in accordance with an aspect of the present technology. As shown, an exemplary embodiment of system 100 may include a number of servers 110 and 170 coupled to a network 150. The system may also include a client 160 capable of wireless communication with the servers 110 and 170 over the network 150.

A server 110 may contain a processor 120, memory 130, and other components typically present in general purpose computers. The memory 130 may store information accessible by the processor 120, including instructions 132 that may be executed by the processor 120. Memory may also include data 134 that can be retrieved, manipulated or stored by the processor 120. The memory 130 may be a type of non-transitory computer readable medium capable of storing information accessible by the processor 120, such as a hard-drive, memory card, ROM, RAM, DVD, CD-ROM, write-capable, and read-only memories. The processor 120 may be a well-known processor, such as processors from Intel Corporation or Advanced Micro Devices. Alternatively, the processor 120 may be a dedicated controller such as an ASIC.

The instructions 132 may be a set of instructions executed directly (such as machine code) or indirectly (such as scripts) by the processor 120. In this regard, the terms "instructions," "steps" and "programs" may be used interchangeably herein. The instructions 132 may be stored in object code format for direct processing by the processor 120, or other types of computer language including scripts or collections of independent source code modules that are interpreted on demand or compiled in advance. Functions, methods and routines of the instructions are explained in more detail below.

The data 134 may be retrieved, stored or modified by the processor 120 in accordance with the instructions 132. For instance, although the system and method is not limited by a particular data structure, the data 134 may be stored in computer registers, in a relational database as a table having a plurality of different fields and records, or XML documents. The data 134 may also be formatted in a computer-readable format such as, but not limited to, binary values, ASCII or Unicode. Moreover, the data 134 may comprise information sufficient to identify relevant information, such as numbers, descriptive text, proprietary codes, pointers, references to data stored in other memories (including other network locations) or information that is used by a function to calculate relevant data.

Although FIG. 1 functionally illustrates the processor 120 and memory 130 as being within the same block, it will be understood by those of ordinary skill in the art that the processor 120 and memory 130 may actually comprise multiple processors and memories that may or may not be stored within the same physical housing. For example, some of the instructions and data may be stored on a removable CD-ROM and others within a read-only computer chip. Some or all of the instructions and data may be stored in a location physically remote from, yet still accessible by, the processor 120. Similarly, the processor 120 may actually comprise a collection of processors, which may or may not operate in parallel.

As shown in FIG. 1, servers 110 and 170 may also include a time master module 135. The time master module 135 may be operable in conjunction with a receiver for receiving time signals. Time masters 135 may serve as accurate time references in a distributed system for (1) synchronizing machines and devices and (2) validating and monitoring that synchronization. This may include serving a reference time to a core network of machines and their supporting infrastructure. For example, an incoming time query from a client 160 may receive a timestamp determined by the time master 135. The timestamps may be based on various types of systems known in the arts for providing an accurate and reliable time reference (e.g., a GPS system).

According to aspects, servers 110 and 170 may consist of middleware software that may manage and integrate the time master module 135 with internal components of the servers 110 and 170. In one aspect, the middleware may consist of a set of services that allow multiple processes running from the time master module 135 to interact with the processor 120, memory 130, instructions 132 and data 134. In some aspects, it may be neither desirable nor possible to run other types of NTP services on a host server 110 in conjunction with a time master module 135. For example, system conflicts can occur over ports assigned to the NTP service severely impacting a time master's reliability.

Servers 110 and 170 may be at a node of network 150 and capable of directly and indirectly communicating with other nodes of the network 150. For example, the servers 110 and 170 may comprise a web server that may be capable of communicating with client device 160 via network 150 such that it uses the network 150 to transmit information to a client application. Servers 110 and 170 may also comprise a plurality of computers, e.g., a load balanced server farm, that exchange information with different nodes of a network for the purpose of receiving, processing and transmitting data to client devices. In this instance, the client computer will typically still be at different nodes of the network 150 than the computers comprising servers 110 and 170. Although only a few servers 110, 170 are depicted in FIG. 1, it should be appreciated that a typical system can include a large number of connected servers with each being at a different node of the network 150.

Each client 160 may be configured, similarly to servers 110 and 170, with a processor 162, memory 163, instructions 164, and data 167. Each client 160 may be a personal computer, intended for use by a person having all the internal components normally found in a personal computer such as a central processing unit (CPU), an optional display device 165 (for example, a monitor having a screen, a projector, a touch-screen, a small LCD screen, a television, or another device such as an electrical device that can be operable to display information processed by the processor), CD-ROM, hard drive, user input 166 (for example, a mouse, keyboard, touch screen or microphone), speakers, modem and/or network interface device (telephone, cable or otherwise) and all of the components used for connecting these elements to one another. Moreover, computers in accordance with the systems and methods described herein may comprise devices capable of processing instructions and transmitting data to and from humans and other computers including general purpose computers, PDAs, network computers lacking local storage capability, set top boxes for televisions, and other networked devices.

Although the client 160 may comprise a full-sized personal computer, the systems and methods of this disclosure may also be used in connection with mobile devices capable of wirelessly exchanging data over a network such as the Internet. By way of example only, a client 160 may be a wireless-enabled PDA, tablet PC, or a cellular phone capable of sending information via the Internet. The user may input information, for example, using a small keyboard, a keypad, or a touch screen.

As shown in FIG. 1, the client 160 may include an application interface module 168. The application interface module may be used to access a service made available by a server such as servers 110 and 170. The application interface module 168 may be a software module operable in conjunction with several types of operating systems known in the arts. For example, the client 130 may be connected to a SQL (Structured Query Language) database server that may operate in conjunction with the application interface module 168 for saving and retrieving information data. Memory 163 coupled to a client 160 may store data 167 accessed by the application module 168. The data 167 can also be stored on a removable medium such as a disk, tape, SD Card or CD-ROM, which can be connected to client 160.

Servers 110 and 170 and client 160 may be capable of direct and indirect communication such as over network 150. For example, using an Internet socket, a client 160 may connect to a service operating on remote servers 110 and 170 through an Internet protocol suite. Servers 110 and 170 may set up listening sockets that may accept an initiating connection for sending and receiving information.

The network 150, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the system and method are not limited to a particular manner of transmission of information. Yet further, although some functions may be indicated as taking place on a single server having a single processor, various aspects of the system and method may be implemented by a plurality of servers, for example, communicating information over network 150.

Figure 2:
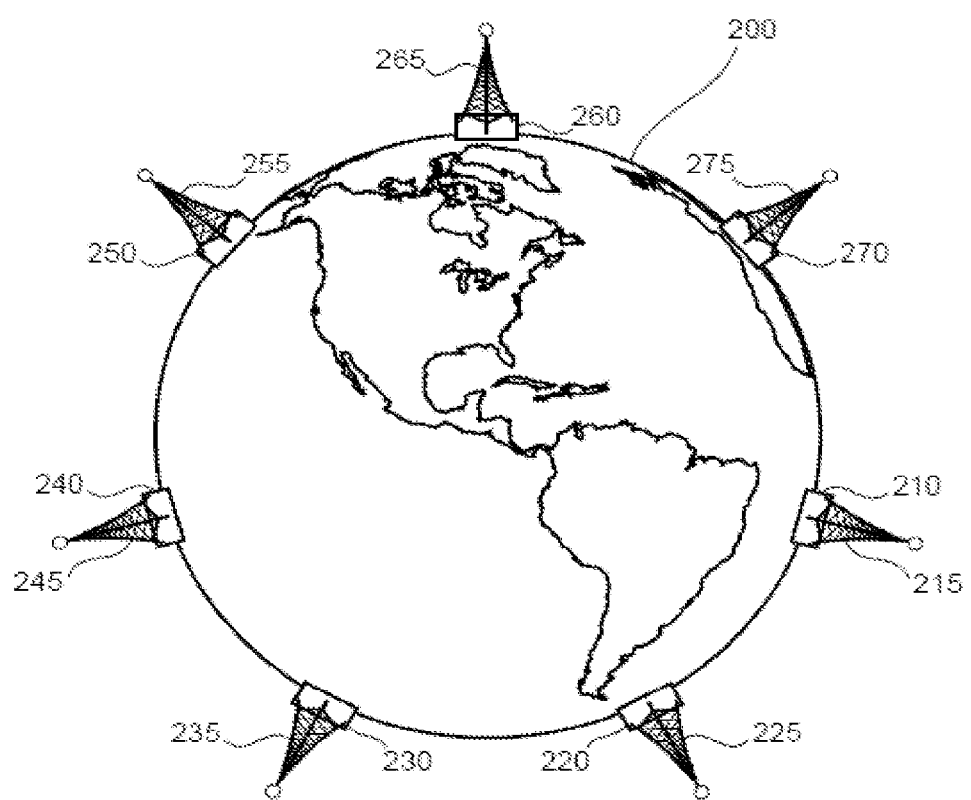
FIG. 2 is a geographical illustration of data centers positioned at various locations on earth according to aspects of the present technology.

FIG. 2 is a geographical illustration of data centers 210, 220, 230, 240, 250, 260 and 270 positioned at various locations on earth. In this example, because of the world wide coverage of a robust global navigation satellite system (GNSS), it may be possible to deploy time masters in data centers 210, 220, 230, 240, 250, 260 and 270 around the world 200. Other existing time distribution systems may not come close to a GNSS system when measured based on reliability, accuracy, coverage and cost. In one aspect, all major data centers in a distributed system may be equipped with redundant time masters, which may provide a stable low-latency time reference to the data center. Redundant time masters may also provide fail-over capability, fault detection, localization and a means for cross checking time masters.

As previously discussed, each host server may be connected to a receiver such as a GPS receiver for receiving time signals. For resilience, it may be preferable to employ several varieties of GPS receivers, e.g., SPECTRACOM Model TSync-PCIe, SYMMETRICOM Model bc637PCI-V2 and MEINBERG. The GPS receivers may require roof-mounted antennas 215, 225, 235, 245, 255, 265 and 275, which may be located on the roof above data centers 210, 220, 230, 240, 250, 260 and 270. Host servers may be housed in server racks located in the data centers 210, 220, 230, 240, 250, 260 and 270. As such, conduits may be installed to route antenna cables from a host server to the roof top antennas. It may be possible to share one antenna across several receivers. This can be achieved, for example, with an antenna splitter. However, antenna sharing may be undesirable because of the low possibility of an antenna failure.

It is conceivable that a GPS receiver may fail. For example, possible scenarios may include latent bugs in GPS receivers, software and satellite software upgrades, and a global catastrophe. In the case of a GPS failure, the ability of a time master to freewheel (e.g., run without a GPS time reference) for several months may allow for enough time to make alternate arrangements. This type of specially configured time master implemented for emergency situations is described in greater detail with respects to FIG. 3.

Figure 3:
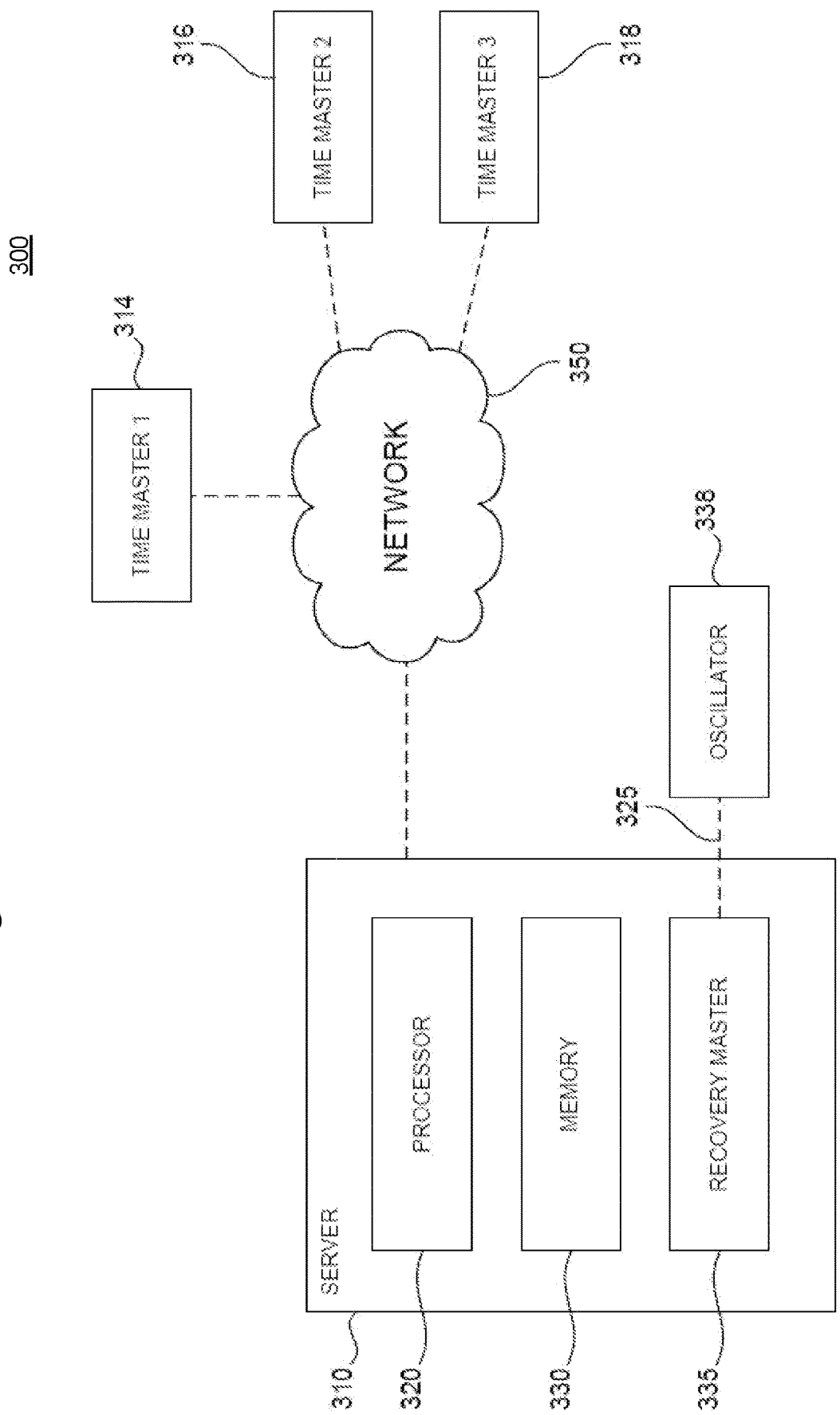
FIG. 3 is another diagram of a system according to aspects of the present technology.

FIG. 3 is another diagram of a system 300 in accordance with some aspects of the present technology. In FIG. 3, a specially configured server 310 may be employed during emergencies to support "Recovery" services. The server 310 may contain a processor 320, memory 330, and other components typically present in general purpose computers. Its components may interact in a similar manner as the components of the servers described with respects to FIG. 1.

As shown in FIG. 3, the server 310 may include a Recovery master module 335, which may replace a time master module. In this configuration, the Recovery master may be frequency-locked 325 to a very stable oscillator 338 instead of, for example, a GPS system. The stability of the oscillator 338 may determine how long and how accurately a Recovery master can serve time. For example, based on empirical data, an oven controlled crystal oscillator (OCXO) may have a short-term frequency stability of ±50 ppb (parts-per-billion, 10-9) with an aging rate of instability at 5 ppb per day, and a rubidium oscillator may have a frequency stability of ±1 ppb with an aging rate of instability at 0.03 ppb per day. It should be noted that time instability errors can accumulate linearly with the short-term stability and quadratically with the aging rate.

According to aspects, a Recovery master 335 can be calibrated against a fleet of time masters 314, 316 and 318 over a network 350. During re-calibration all available ordinary time masters may participate. Each time master 314, 316 and 318 may be synched, for example, to an individual time reference such as a GPS feed. Although only one Recovery master 335 is depicted in FIG. 3, it should be appreciated that a typical system 300 can include a number of Recovery masters, with each being at a different node of the network 350. According to aspects, re-calibrations may be staggered across several Recovery masters to avoid injecting undetected failures (e.g., GPS signal failures) into multiple Recovery masters.

An initial re-calibration interval between a Recovery master 315 and the ordinary time masters 314, 316 and 318 may be short to achieve a relatively rapid approximate synchronization. To achieve an increasingly accurate calibration, the interval may be doubled in each subsequent re-calibration until it reaches a configured constant (e.g., 60 days for Rubidium-based Recovery master and 2 days for OXCO-based Recovery master). Calibration parameters may be stored in a persistent file so that the parameters survive software restarts and server re-boots. For example, a calibrations file can be loaded into memory 330 whenever a server 310 starts. The calibrations file may contain a reference number corresponding to time master 314, 316 and 318 and corresponding calibration parameters. The re-calibrations may be discarded whenever a frequency reference is disturbed (e.g., when a time reference is power cycled).

In addition to the components described above and illustrated in the figures, various operations will now be described. It should be understood that the following operations do not have to be performed in the precise order described below. Rather, various steps may be handled in a different order or simultaneously. Steps may also be added or omitted unless otherwise stated.

According to aspects, to ensure that timestamps computed in a disturbed system are trustworthy, a subroutine, referred to herein as a time synchronization daemon, may be executed. Time synchronization daemons may be employed on one or a number of host machines simultaneously (e.g., client and time master host machines). By querying a fleet of time masters to determine a current timestamp, the time synchronization daemons may periodically compare the host's machines notion of time against the fleet of time masters. Once the fleet time masters have been queried for the current time, the time synchronization daemon may track the round-trip query delay associated with querying each time master. In some aspects, the time synchronization daemon can calculate synchronization offset intervals that may be relative to a time master (e.g., an interval between local time and a time master's notion of current time).

To detect and reject offset intervals derived from possibly malfunctioning time masters (e.g., time masters that have failed but are still producing timestamps), a voting method may be used such as a variant of Marzullo's algorithm. As a result of the voting method, the time synchronization daemon may accept output from validated time masters or reject output from certain time masters, for example, malfunctioning time masters.

Figure 4:
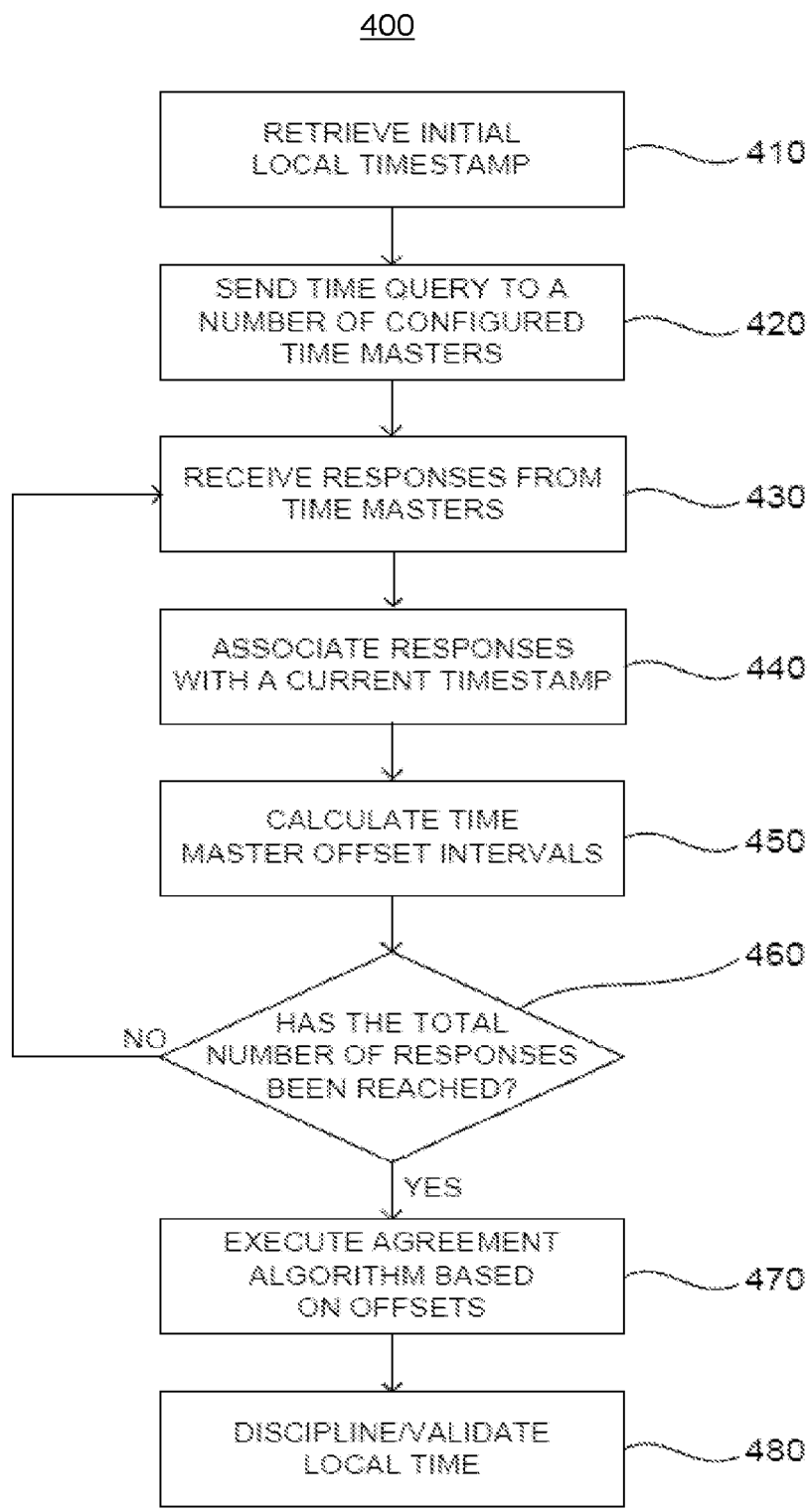
FIG. 4 is a flow diagram illustrating an example of a method for synchronizing a host machine to a set of time references according to aspects of the present technology.

FIG. 4 is a flow diagram illustrating an example of a method 400 for synchronizing a host machine (e.g., GPS-fed time master, Recovery masters and client host machine) to a set of time references. As previously discussed, time synchronization may involve time querying a configured subset of time masters and executing a voting algorithm on the query results to determine which time masters are producing accurate current timestamps.

In block 410, an initial local timestamp may be retrieved. For example, method 400 may access a registry for storing a host machine's notion of a current date and time. This may reflect time from an internal time clock on the host machine. The timestamps can be encoded in various time formats used to describe instants of time such as Coordinated Universal Time (UTC), Unix epoch and the unambiguous International Atomic Time epoch (TAI).

In block 420, time queries may be sent to a pre-determined number of time masters (e.g., 5 to 10 time masters). For example, an application interface may be utilized to make a connection to a time master for sending and receiving information. In one aspect, the time masters may operate at Stratum 1 or Stratum 2. It is also possible for time masters to operate at any arbitrary number such as from [1 . . . K]. The basic definition of a Stratum-1 time master is that it may be directly linked (e.g., not over a network connection) to a reliable source of time such as a GPS receiver. A Stratum-2 time master may be connected to one or more Stratum-1 time masters over, for example, a network connection. In this example, a Stratum-2 time master may get its time via a network request to one or more Stratum-1 time master. In this regard, if a Stratum master is fed by a master operating at stratum K or less, it may be described as a Stratum-(K+1).

In block 430, responses may be received from the time masters queried in block 420. For example, as a result of the time request a time master may generate a timestamp. According to aspects, time masters may publish timestamps over a network connection in a distributed system. In one aspect, the application interface used to request a timestamp in block 420 may also be used to retrieve timestamp responses. Various other techniques for transmitting data over a network socket can be used to publish and receive timestamp responses, e.g., Transmission Control Protocol/Internet Protocol (TCP/IP), World Wide Web's Hypertext Transfer Protocol (HTTP), File Transfer Protocol (FTP), Telnet (Telnet) protocols and other types of communication protocols.

In block 440, a received time query response may be associated with a current local timestamp. For example, the current local timestamp may denote respective events of reception of the time query response according to a local time scale. In some aspects, associating the current local time with the time query response may be accomplished by storing both in memory, a data structure or by inserting both in a suitable computer readable medium capable of storing information accessible by a processor.

In block 450, a time offset interval may be calculated for each time masters that was queried in block 420. The offset interval's width (e.g., a length of time duration) may represent transmission delays associated with a time request to and from a particular time master. The timestamps from each non-malfunctioning time master may correspond to an instant of time somewhere between the initial local timestamp taken in block 410 and the local timestamp associated with a time master's response in block 440.

A level of uncertainty (e.g., transmission delays) may also affect the time offset interval calculation. In this regard, to calculate the offset interval for each time master, the following equations may be used:

$$D(m)=T(m)-((L(m)+L(0)/2)$$

$$U(m)=(L(m)-L(0))/2$$

In the above equations, $D(m)$ represents the time offset relative to time master m, $T(m)$ represents the timestamp provided by master m, $U(m)$ represents an uncertainty related to a time master m, $L(m)$ represents the local time captured at the time when a time query response was received from time master m and $L(0)$ represents a local timestamp taken prior to dispatching the time queries to the time masters. Thus, with respects to a time master m, local time may be in error by an offset $D(m)$ plus or minus the uncertainty calculation $U(m)$ or in other words an interval range of $[D(m)-U(m)$ to $D(m)+U(m)]$.

In block 460, it may be continually tested whether the total number of time query responses has been reached. If the number has been reached, then method 400 may proceed to block 460. Otherwise, method 400 may repeat block 430 and receive another time query response.

In block 470, an agreement algorithm may be employed to analyze an aggregate of the time master offset intervals calculated in block 450. Because time masters may occasionally fail, an agreement algorithm (e.g., Marzullo's algorithm) may determine a smallest time offset interval consistent among a selected group of time masters. In some aspects, the agreement algorithm may be employed more than once.

In an initial run of the agreement algorithm, a group of local time offsets calculated in block 450 may be selected. The selection may be based on a corresponding time master's configuration such as whether a time master is operating at Stratum 1. Each calculated offset may represent the local clock error relative to a particular time master. A determination may be made by method 400 for a maximal set of intersecting local time offsets from the group. In one example, if no two offset intervals intersect method 400 may stop. Method 400 may also stop if more offsets in the group disagree than agree. If at least two offset intervals intersect than an agreement validated offset interval (e.g., a smallest interval containing all points lying in the intersection of at least k−1 of the k intervals in the group) may be assigned for the group.

In one aspect, a level of uncertainty may be reflected in a group of offsets in an interval (e.g., the width of the group from smallest to largest offset). This level of uncertainty may be relatively small because typically several time masters may be nearby. Thus, the agreement validated offset determined in block 470 should be relatively accurate plus or minus a level of group uncertainty.

According to some aspects, the agreement algorithm may be employed a second time. In this iteration of the agreement algorithm, local time offsets calculated in block 450 may be selected from a group of time masters configured differently than the first group. For example, this selection may be based on time masters not operating at Stratum 1. The offset intervals corresponding to the non-Stratum 1 time masters may be clipped against the Stratum 1 offset interval. The second round may be used to steer local clocks when there is no nearby Stratum 1 time master, thus improving consistency among nearby hosts.

The second iteration of the agreement algorithm may be then applied to the clipped non-Stratum 1 offsets. This second iteration may yield a final validated offset interval which may be accurate plus or minus a level of uncertainty related to the second group of time masters. Typically, this final validated offset interval should be within the uncertainty range resulting from the first run of the agreement algorithm. In one example, the second iteration results may be discarded if the results are outside of the uncertainty range of the first iteration.

In block 480, local time on a host machine may be disciplined or validated depending on the machine's configuration. For example, if the machine employing method 400 is a GPS-fed time master, the offset interval from block 470 may be used to validate time published by the GED-fed master. If the machine is a client host or a Recovery master, the offset interval from block 470 may be used to adjust the host machine's local clock. For example, if the offset interval is [−2, −1] the local clock can be somewhere between 1 and 2 seconds ahead of the masters. If the interval is [1, 2] the local clock can be 1 to 2 seconds behind the masters. If the interval is [1, −1] the local clock can be somewhere between 1 second behind to 1 second ahead of the master.

In this regard, a host server's local system clock may be disciplined to help keep precise time. For example, small adjustments (e.g. the validated offset from block 470) may be applied to the system clock periodically. These adjustments may be applied using various utilities for accessing a system's local clock such as the utility application adjtimex. In one aspect, adjtimex may be used in PLL mode (phase-locked loop). In this example, PLL constants and offset clamps values may be chosen to bind the local clock rate error to approximately 1000 ppm. Some applications, for example, distributed lease protocols, may depend on time progressing at a similar rate on each host. For such applications to work properly clock rates need to be controlled.

Figure 5:
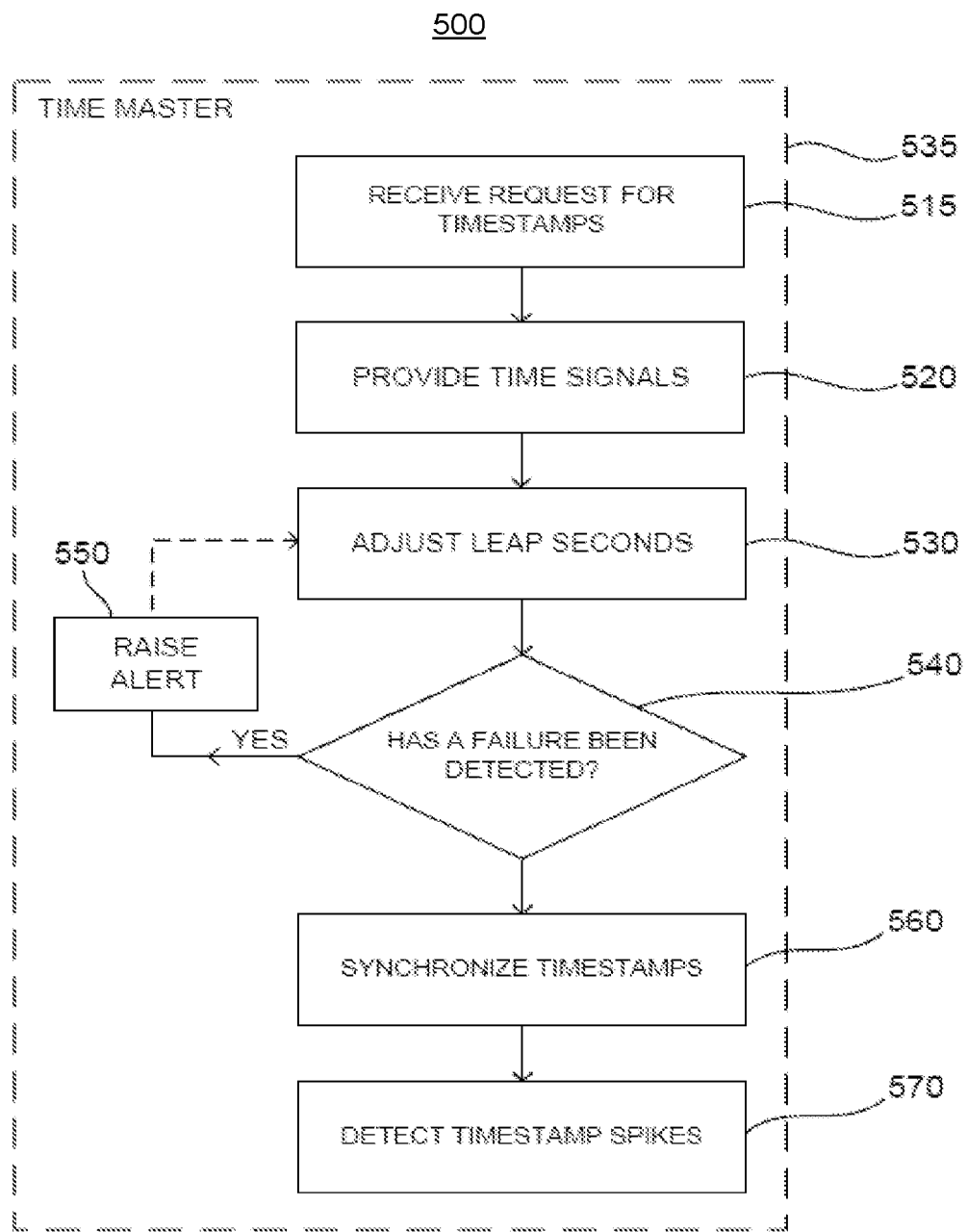
FIG. 5 is a flow diagram illustrating an example of a method for providing validated timestamps according to aspects of the present technology.

FIG. 5 is a flow diagram illustrating an example of a method for providing validated timestamps. According to aspects, cross checked and synchronized time masters 535 may be used to transmit timestamps to clients in a distributed system. In some examples, the timestamps may be used to order transactions and/or synchronize local clocks.

In block 515, a request for a timestamp may be received. For example, a client may open a socket connection to time master's host server to initiate a connection for sending and receiving information. Through this connection, the time master may act as a NTP server that transmits timestamps to the client.

In block 520, time signals may be provided from a reliable time reference. For example, GPS timestamps may be provided by a GPS disciplined oscillator (e.g., a SPECTRACOM PCI-Express Model TSync-PCIe) connected to a host server. In some aspects, timestamps may be served directly from the system's oscillator. According to aspects, this may help avoid several sources of time corruption such as time-keeping bugs related to operating systems, and Time Stamp Control (TSC) deficiencies that plague many microprocessors.

In block 530, GPS timestamps may be adjusted based on a leap second. A leap second may be a positive or negative one-second adjustment to a time scale that may keep it close to mean solar time. In some aspects, leap seconds may be amortized over a period of ten hours on either side of the leap second, thus rendering the leap second invisible to a client requesting a timestamp. Several techniques may be used to amortize leap seconds, for example, they may be linearly amortized over a window of time (e.g., 10 hours on either side). A standard leap file disseminated by the National Institute of Standards and Technology (NIST) may govern leap second insertions.

In block 540, possible system failure conditions may be continually monitored. For example, a failure can be a discovered disagreement between the NIST leap file and leap seconds advertised by a connected GPS system. Other possible failures may include when the NIST file is about to expire, poor satellite signal reception, a shorted antenna cable, parity errors, etc. If a failure condition is detected, method 500 may raise an alert at block 550. Otherwise it may proceed to block 560.

In block 550, a failure alert may be raised. Once a failure condition has been detected a time master 535 may block or discard incoming time queries until the alert has been resolved. Typically, many failures may require some type of repair to be preformed. For example, some alerts may be resolved by making a request to a service for an updated NIST file for adjusting leap seconds. In this example, method 500 may optionally repeat block 530 to adjust leap seconds based on the newly provisioned NIST file. Other failures may be resolved by repairing a GPS receiver or other hardware.

In block 560, timestamps may be synchronized with an external reference. For example, timestamps from a secondary device such as a High Precision Event Timer (HPET) attached to a time master host may be used as a sanity check. According to aspects, on a server running an Intel processor, the HPET may be a fairly reliable timing device. HPET accesses can impact processing time by several microseconds. This, however, may be an acceptable impact in performance.

In block 570, timestamp spikes may be detected. If a timestamp lies outside of a determined range, it may be considered a spike. The spikes may be logged, but not transmitted to clients. In one example, spikes may be detected by planting guideposts to demark an acceptable range for the timestamps. In this example, a guidepost can be correlated GPS and HPET timestamps planted periodically. Each GPS timestamp may be checked against the bounds since the last guidepost was planted. This check may provide a measure of protection against, for example, GPS system faults and satellite signal spoofing attacks. The spike-detection process employed in block 560 is further described with respects to FIG. 6.

Figure 6:
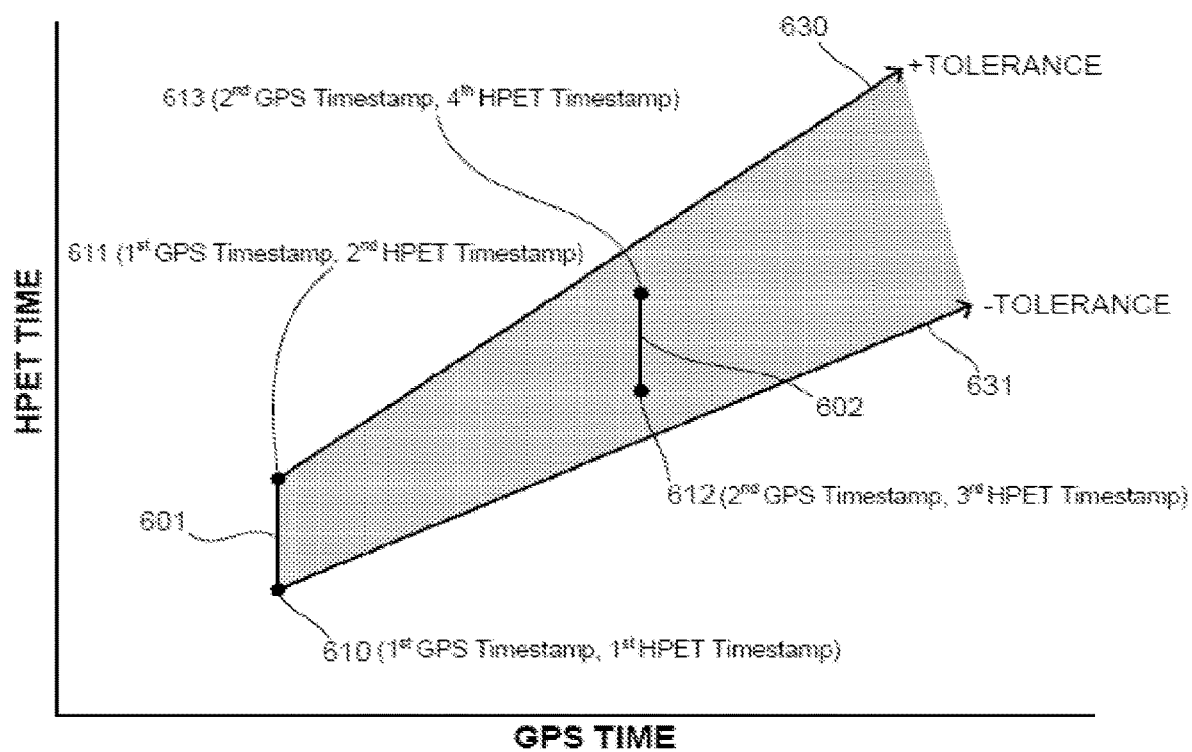
FIG. 6 is a graph of correlated time stamps according to aspects of the present technology.

FIG. 6 is a graph of correlated time stamps. In some aspects, correlated GPS and HPET time stamps may be represented as a graph. As shown in Figure, guideposts 601 and 602 are associated with a series of GPS and HPET time stamps 610, 611, 612 and 613 plotted on the graph (e.g., (x, y) coordinates). For example, plot points 610 and 611 are determined by a pair of GPS and HPET time stamp readings. According to aspects, guidepost 601 may be associated with three timestamps taken in the following order: a 1st HPET timestamp, a 1st GPS timestamp and a 2nd HPET timestamp. In one aspect, dumbbell 601 may be used as a guidepost to validate subsequent GPS timestamp readings as further described below.

As illustrated, emanating from the initial guidepost 601 are rays 630 and 631 positioned at angles. A shaded region (e.g., the cone of uncertainty) between the rays reflects an uncertainty about the precision of the HPET frequency plus or minus a predetermined tolerance level. According to aspects, if a subsequent reading of a GPS timestamp intersects the shaded region, it may be accepted as a valid timestamp. If it does not intersect the shaded region, it may then be declared a spike because it violates the HPET frequency error bounds 630 and 631.

The guidepost 601 may be advanced at a rate determined by roughly balancing the uncertainty induced by HPET frequency errors, the GPS system and HPET read latencies. In one example, guideposts are advanced approximately every 100 milliseconds. A new guidepost, such as guidepost 602, may be planted when the previous guidepost 601 expires and a new valid GPS timestamp is obtained for verification. The newly obtained GPS timestamp may also become an anchor in the new guidepost. For example, plot points 612 and 613 of guidepost 602 are determined by a subsequent pair of GPS and HPET time stamp readings. In one aspect, the guidepost 602 may be associated with three timestamps taken in the following order: a 3rd HPET timestamp, a 2nd GPS timestamp and a 4th HPET timestamp.

According to aspects, spikes with high-frequency synchronization errors that exceed approximately 20 microseconds may be detected. As well as, low frequency wander spikes exceeding the worst-case HPET variation. In some aspects, it may be desirable to use a number of spike detectors, each advancing at a different rate. In this regard, a spike detector advancing at a rapid rate may be better at detecting high-speed spikes, while a detector advancing at a slower rate may be better at detecting gradual frequency shifts in a time master.

Figure 7:
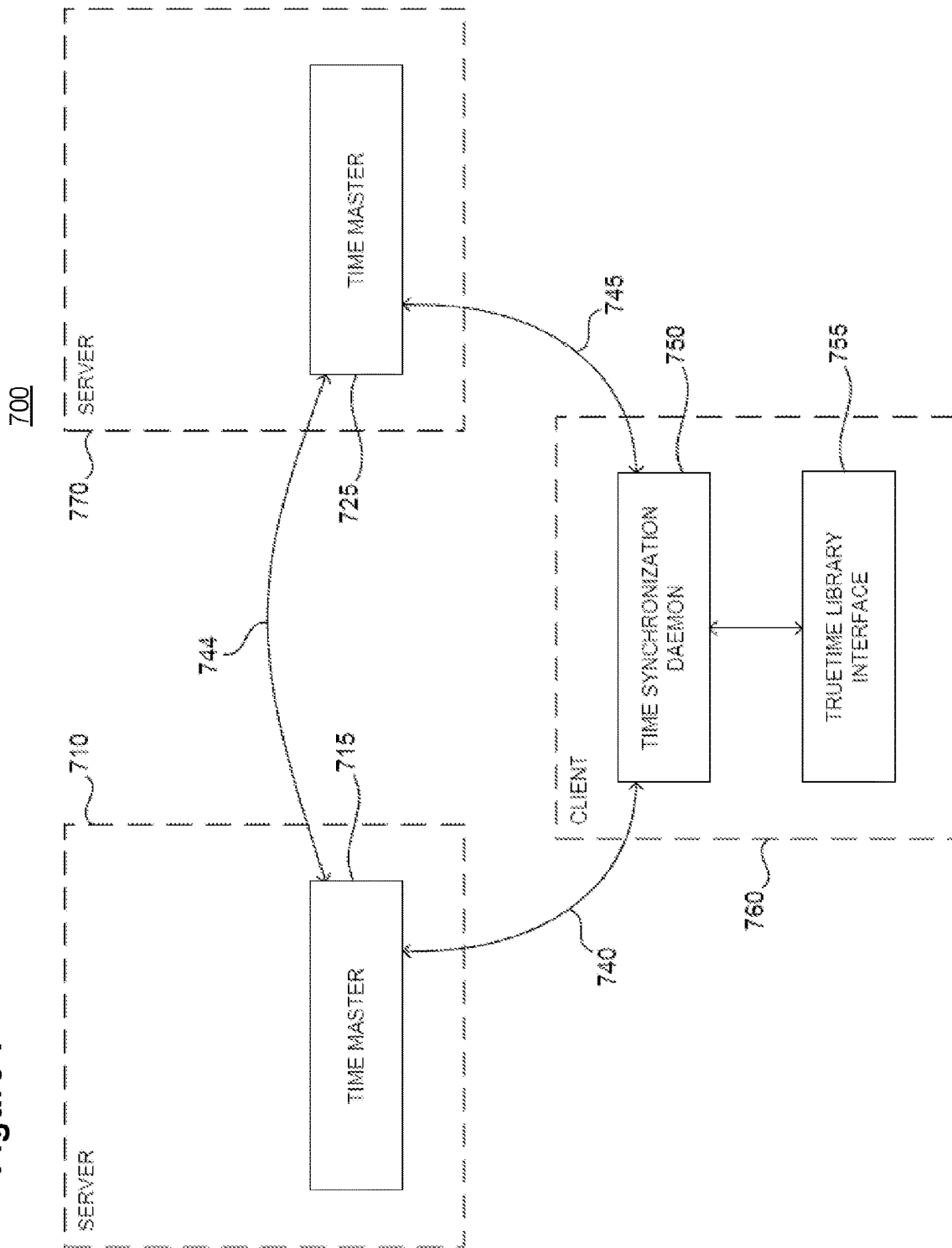
FIG. 7 is another diagram of a system according to aspects of the present technology.

FIG. 7 is yet another diagram of a system 700 in accordance with an aspect of the present technology. As shown, system 700 may consist of at least three major modules: a time master (e.g., time masters 715 and 725) that may serve as a reliable time reference, a time synchronization daemon 750 that may synchronize local time by periodically querying multiple time masters and a TrueTime library interface 755 for providing a current time interval interface to applications. The three modules may be capable of direct and indirect communication over, e.g., a network connection 740 and 745. Each module may consist of middleware software that may manage and integrate the modules with a host machines 710, 760 and 770 such as the servers and client described with respects to FIG. 1.

According to aspects, time masters 715 and 725 may serve as primary time references in a distributed system. As previously discussed, the time masters' internal clocks may be synchronized with, e.g., a GPS signal, atomic clock or other types of accurate timekeeping technologies known in the arts. The time masters may be designed for high reliability and may be deployed at multiple sites throughout a distributed system. Although only two time masters are depicted in FIG. 7, it should be appreciated that a typical system 700 can include a large number of time masters communicating with each other over, e.g., a network connection 744.

The time synchronization daemon 750 may periodically query multiple time masters 715 and 725 for a current timestamp. The daemons may calculate synchronization offset intervals relative to each time master 715 and 725 by tracking round-trip delays related to a time query. Sets of time master offsets may be validated against each other using, e.g., clock synchronizing techniques as described with respects to FIG. 4. As previously discussed the clock synchronizing techniques may employ an agreement algorithm to detect and reject offsets from malfunctioning time masters. An intersection of surviving offset intervals may be used to determine a client's local time synchronization error, which may have occurred at the time a query was made to a time master 715 and 725. Accordingly, the client's local clock rate may be updated based on the surviving offset intervals.

A TrueTime library interface 755 may be employed to transmit validated timestamps requested by client applications. For example, a client may use an application programming interface (API) that may be operable in conjunction with the TrueTime library in order to communicate with modules of system 700. The TrueTime library may also calculate a local time offset interval (e.g., a difference between local time and a time reference) based on such factors as a local clock, known rate errors related to the local clock, and an offset interval determined by the time synchronization daemon 750 at the last time the time masters 715 and 725 were polled.

In some instances, it may be difficult to determine an order of events in a distributed system because system clocks are not always synchronized. However, event ordering can be determined using timestamps generated with the TrueTime library rather than using a machine-local approximation of current time. In one aspect, timestamps determined by employing the TrueTime library can be used as a basis for making causally dependent information available to host clients in a distributed system. For example, this information can be used by an application associated with a host client to causally order event transactions.

Figure 8:
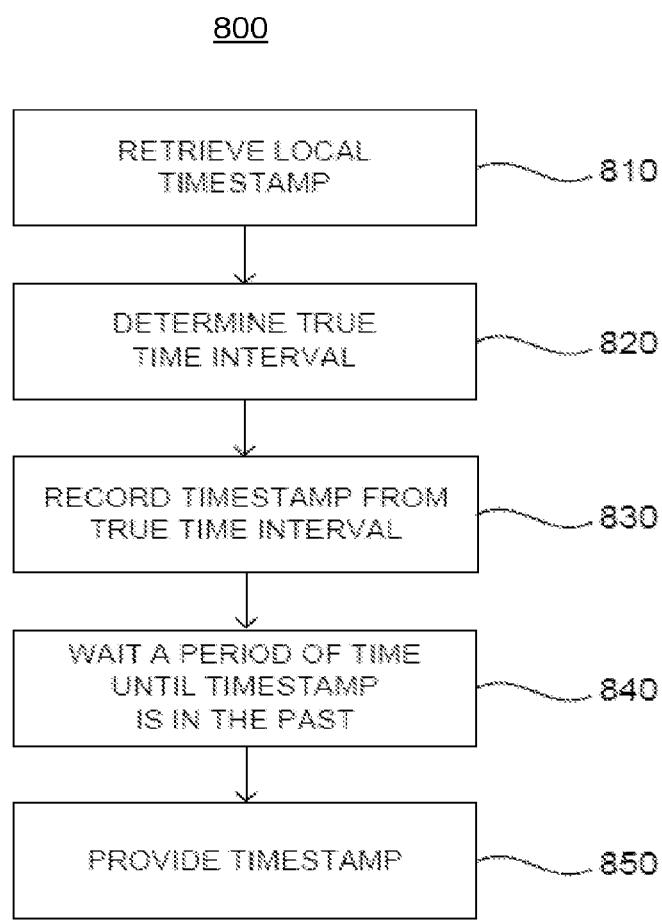
FIG. 8 is a flow diagram illustrating an example of a method for generating causal timestamps according to aspects of the present technology.

FIG. 8 is a flow diagram illustrating an example of a method 800 for generating causal timestamps. For example, a host client may employ an application interface (e.g., TrueTime library interface), which may provide globally consistent timestamps with explicit uncertainty bounds (e.g., network transmission delays) associated with transmitting the timestamps. The timestamps may be then used, for example, to order events in a distributed system.

In block 810, an initial local timestamp may be retrieved. For example, a host client's notion of a current date and time may be accessed and stored. This may reflect time from an internal time clock, memory registry or other means of tracking time on the host machine.

In block 820, a time interval may be determined (e.g., a difference between the local timestamp and a time reference). For example, a software module operable in conjunction with a TrueTime library interface may request a time interval provided by the TrueTime library. As previously discussed the TrueTime library may provide a time interval interface to host clients requiring meaningful globally-coherent timestamps. The TrueTime library may determine the time interval from a time synchronization daemon employed locally on a host client. As described with respect to FIG. 7, host clients may employ a time synchronization daemon, which may track a correlation between local clocks and causal time by computing uncertainty bounds on that correlation. The time synchronization daemon may derive a causal time by querying a number of time masters deployed throughout a distributed system. In some aspects, the time synchronization daemon may determine a time interval consistent among a selected group of time masters by employing an agreement algorithm on the selected group.

In block 830, a timestamp from the time interval may be recorded. For example, the latest timestamp in the time interval determined in block 820 may be selected. According to aspects, this timestamp may be larger than the timestamp of other causal predecessors. In one aspect, the timestamp may be recorded and maintained in a predetermined format. For example, the timestamp can be encoded in a time format used to describe instants of time such as UTC. Consistent time formatting may, for example, allow for comparison of the timestamp with local timestamps from one or more different systems.

In block 840, a period of time may pass after a timestamp is recorded from the time interval. The time period for waiting may be chosen so that after the waiting period the time of recorded timestamp has passed. According to aspects, waiting may preserve the causal order of events by ensuring that causal successors (e.g., logically ordered transactions) will be assigned respectively larger timestamps. For example, if the current time is between 3:50 PM and 4:00 PM, and a 10 minute waiting period is chosen, then after the waiting period it will be later than 4:00 PM and, thus any future-chosen timestamps will be later than 4:00 PM. It will be appreciated that in some aspects other types of client computations can occur in block 840 while the time period is passing.

In block 850, the recorded timestamp may be provided. For example, a programming interface may be used by a host client to access the recorded timestamp from block 830. The timestamp may also be returned as a result of a call to a computer program, library class function or other types of programming techniques known in the arts. The host client may then associate the timestamp, e.g., with host client events thereby ensuring a causal order of event transactions for services accessed at the client.

The above-described aspects of the technology may be advantageous for generating globally synchronized timestamps without incurring various types of network uncertainty inherent in explicit synchronization. The globally synchronized timestamps can be used by various services, e.g., to validate local timestamps and clocks, or to provide causality-respecting timestamps for database updates. By introducing techniques to track, calculate and record time data relative to a number of reliable time references, an easy-to-manage and low-cost time base may be provided for host machines in a distributed system. Moreover, the various techniques and parameters disclosed within may be further reconfigured to increase overall timestamp accuracy.

FIGS. 9-16B illustrate a database management system 950 used for storing multiversion databases. The disclosed embodiments of database management systems 950 do not require globally synchronized timestamps as taught in FIGS. 1-8. However, some embodiments of database management systems 950 utilize globally synchronized timestamps as taught in FIG. 1-8, including some embodiments where the multiversion database includes replicas at multiple distinct geographical locations.

Figure 9:
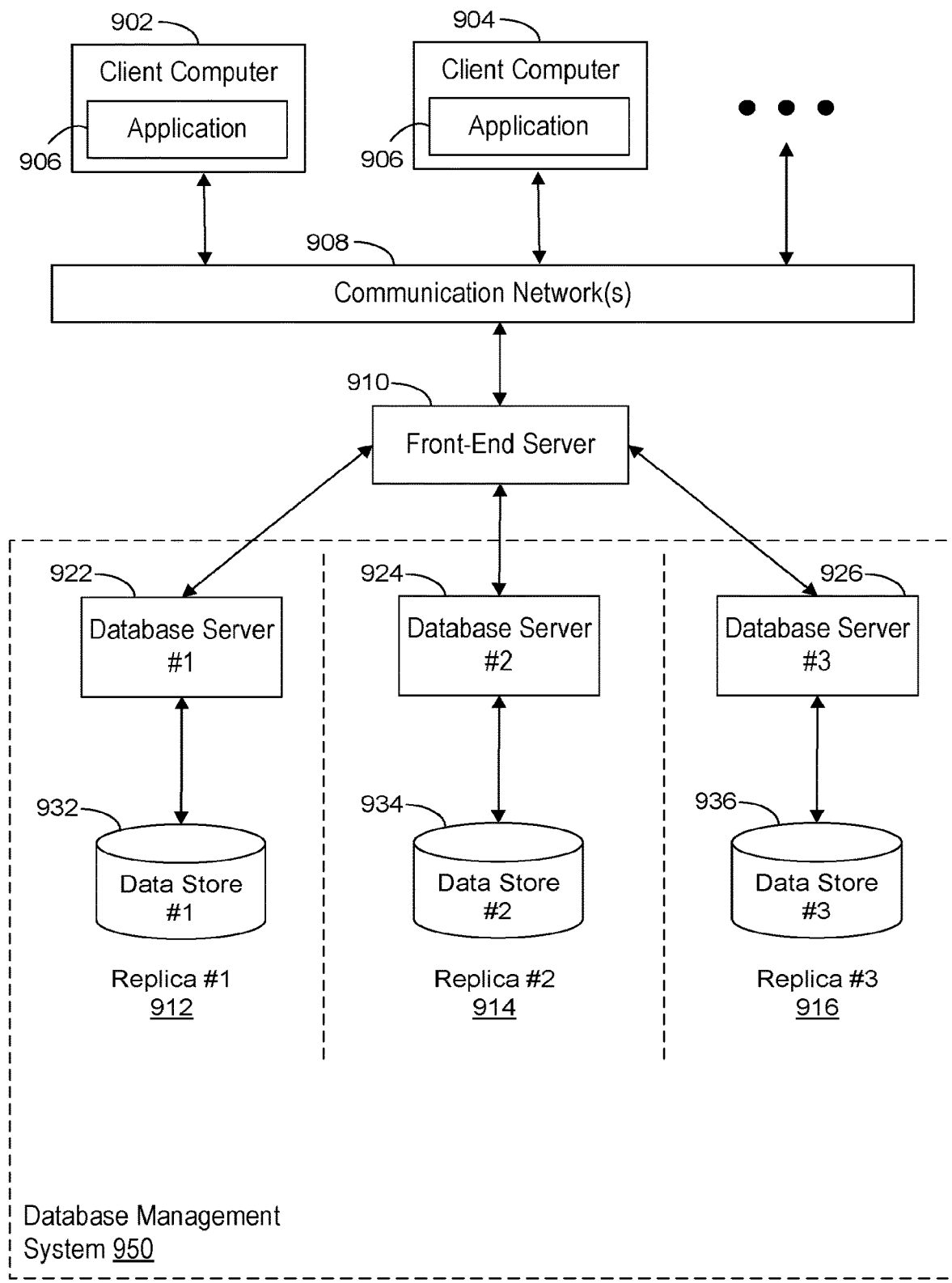
FIG. 9 is a conceptual block diagram of a database management system in accordance with some embodiments.

FIG. 9 is a conceptual block diagram of a database management system 950 in accordance with some embodiments. In this embodiment, three distinct replicas 912, 914, and 916 of the database are maintained at three distinct geographic locations. In some embodiments, the Paxos consensus algorithm is used is guarantee consistency of the data across the multiple replicas. Replica 912 has a data store 932, which physically stores the data. In some embodiments, the data store 932 is a file system maintained by a plurality of file servers. In some embodiments, the data store 932 comprises one or more Bigtables or Bigtable cells. At replica 912, one or more database servers 922 read and write data to the data store 932. Although FIG. 9 illustrates only a single database server 922 accessing the data store 932, most embodiments include a plurality of database servers 922, such as 100 or 1000 servers 922.

Replica 914 includes database server(s) 924 and data store 934, similar to replica 912, and replica 916 includes database server(s) 926 that access data store 936, again like replica 912. In some embodiments, one or more of the replicas 912, 914, or 916 is designated as read-only. A read-only replica is kept synchronized with the other replicas, but cannot be designated to respond to client requests to write data (only client read requests).

As illustrated in FIG. 9, client computers 902 and 904 can access the data from the database management system 950 by sending the requests over a communications network 908, such as the Internet. The requests are sent from a software application 906 executing on a client computer 902 or 904, which may be a web application 906 that runs in a web browser 1020. The client requests to read or write data are received by a front end server 910, which directs the requests to an appropriate replica of the database. In some embodiments, the front end server includes a load balancing module 1174 to spread out the incoming requests among the replicas. Although FIG. 9 illustrates only a single front-end server 910, many embodiments include a plurality of front-end servers 910, such as 10, 20, or 50 servers.

Figure 10:
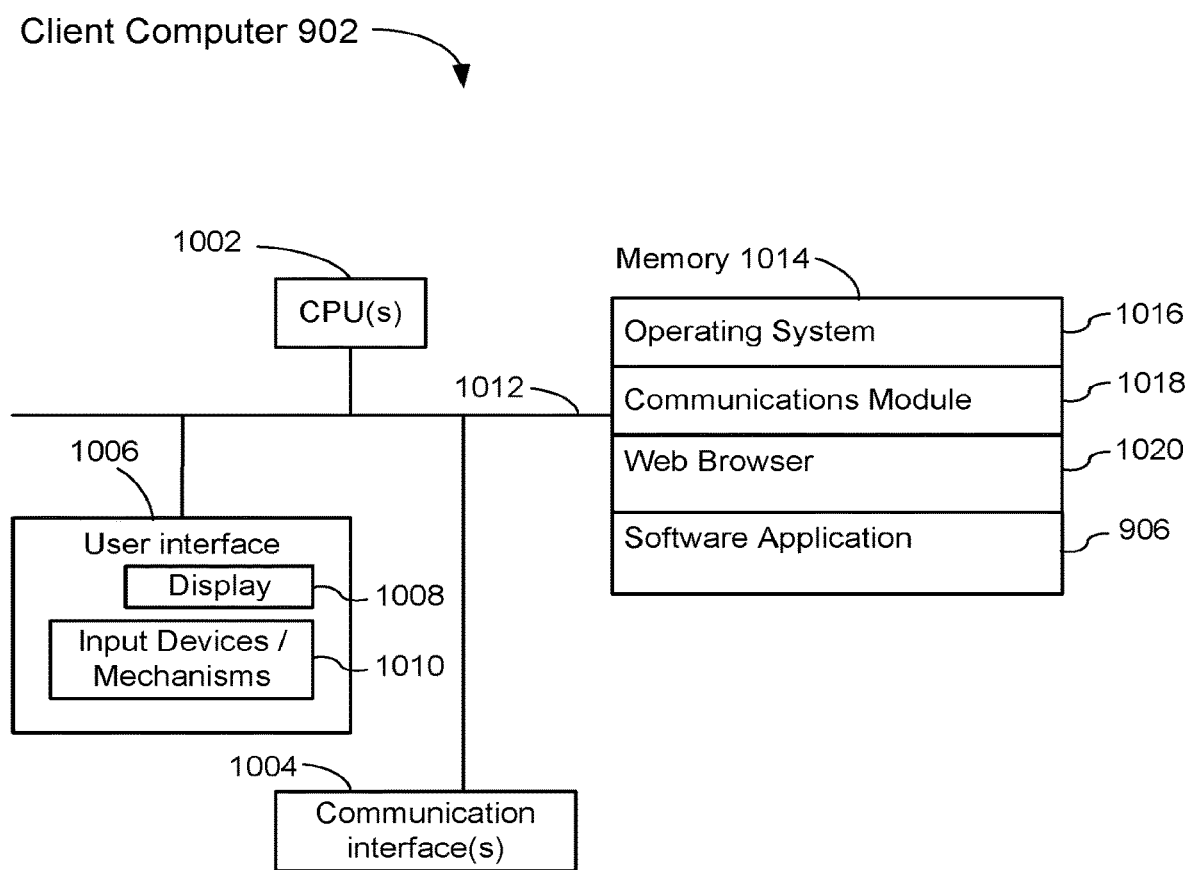
FIG. 10 is a functional block diagram of a client computer in accordance with some embodiments.

FIG. 10 illustrates a typical client computer 902. A client computer 902 generally includes one or more processing units (CPUs) 1002, one or more network or other communications interfaces 1004, memory 1014, and one or more communication buses 1012 for interconnecting these components. The communication buses 1012 may include circuitry (sometimes called a chipset) that interconnects and controls communications between system components. A client computer 902 includes a user interface 1006, for instance a display 1008 and one or more input devices 1010, such as a keyboard and a mouse. Memory 1014 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1014 may include mass storage that is remotely located from the central processing unit(s) 1002. Memory 1014, or alternately the non-volatile memory device(s) within memory 1014, comprises a computer readable storage medium. In some embodiments, memory 1014 or the computer readable storage medium of memory 1014 stores the following programs, modules and data structures, or a subset thereof:

- an operating system 1016 (e.g., WINDOWS, MAC OS X, ANDROID, or iOS) that generally includes procedures for handling various basic system services and for performing hardware dependent tasks;
- a network communications module 1018 that is used for connecting the client computer 902 to servers or other computing devices via one or more communication networks 908, such as the Internet, other wide area networks, local area networks, metropolitan area networks, and the like;
- a web browser 1020, which allows a user of the client computer 902 to access web sites and other resources over the communication network 908; and
- a software application 906, which may be a web application. The software application 906 accesses web resources, including data from the database management system 950.

Figure 11A:
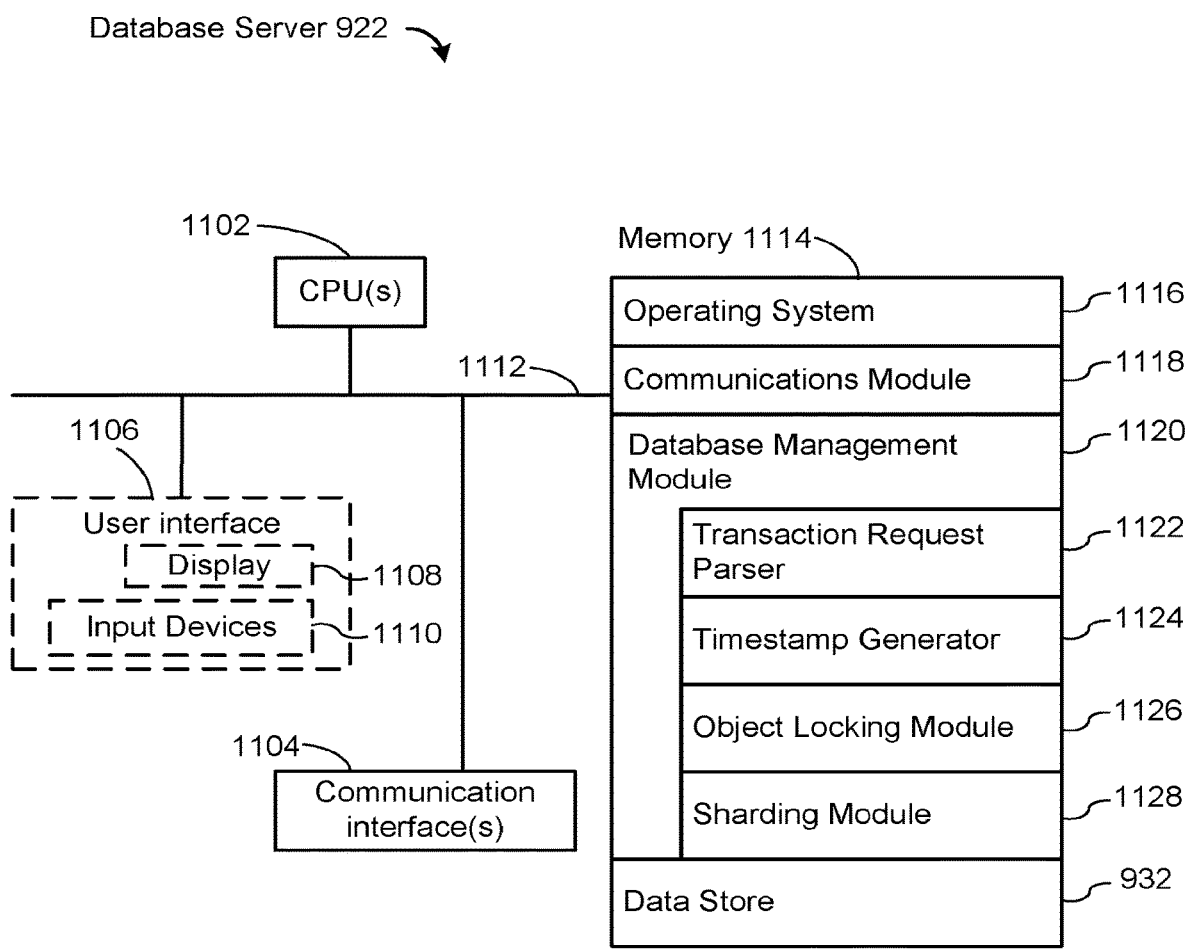
FIG. 11A is a functional block diagram of a database server in accordance with some embodiments.

Referring to FIG. 11A, a database server 922 generally includes one or more processing units (CPUs) 1102, one or more network or other communications interfaces 1104, memory 1114, and one or more communication buses 1112 for interconnecting these components. The communication buses 1112 may include circuitry (sometimes called a chipset) that interconnects and controls communications between system components. A database server 922 may optionally include a user interface 1106, for instance a display 1108 and a keyboard 1110. Memory 1114 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1114 may include mass storage that is remotely located from the central processing unit(s) 1102. Memory 1114, or alternately the non-volatile memory device(s) within memory 1114, comprises a computer readable storage medium. In some embodiments, memory 1114 or the computer readable storage medium of memory 1114 stores the following programs, modules and data structures, or a subset thereof:

- an operating system 1116 (e.g., LINUX or UNIX) that generally includes procedures for handling various basic system services and for performing hardware dependent tasks;
- a network communications module 1118 that is used for connecting the database server 922 to other servers or other computing devices via one or more communication networks 908, such as the Internet, other wide area networks, local area networks, metropolitan area networks, and the like;
- a database management module 1120, which includes various procedures and modules for handling requests to read or write data in the data store 932;
- a transaction request parser 1122 included in the database management module 1120, which parses incoming transaction requests to determine the type of transaction (e.g., read or write), the rows and columns accessed, etc.;
- a timestamp generator 1124 included in the database management module 1120, which generates timestamps for read and write requests. This is described in more detail below with respect to FIGS. 14A, 14B, and 15;
- an object locking module 1126 included in the database management module 1120, which locks objects as necessary to guarantee data integrity, and blocks processes that require a lock on an object that is already locked by another process;
- a sharding module 1128 included in the database management module 1120, which splits a row into multiple shards when the size of the row exceeds a threshold size, and tracks the locations of the multiple shards so that the sharding is transparent to client requests. Sharding is described in greater detail with respect to FIGS. 12E-12G below; and
- a data store 932, which physically stores the data. In some embodiments, the data store 932 is part of the database server 922 (e.g., the physical hard disks of the database server). In many embodiments, the data store 932 is separate from the database server(s) 922 as illustrated in FIG. 9, and includes permanent storage distributed across a large number of physical disks or other permanent storage media.

In many embodiments, there are multiple database servers 922, such as 100 or 1000, each accessing data from the data store 932. The database servers 924 and 926 illustrated in FIG. 9 are similar to database server 922.

Figure 11B:
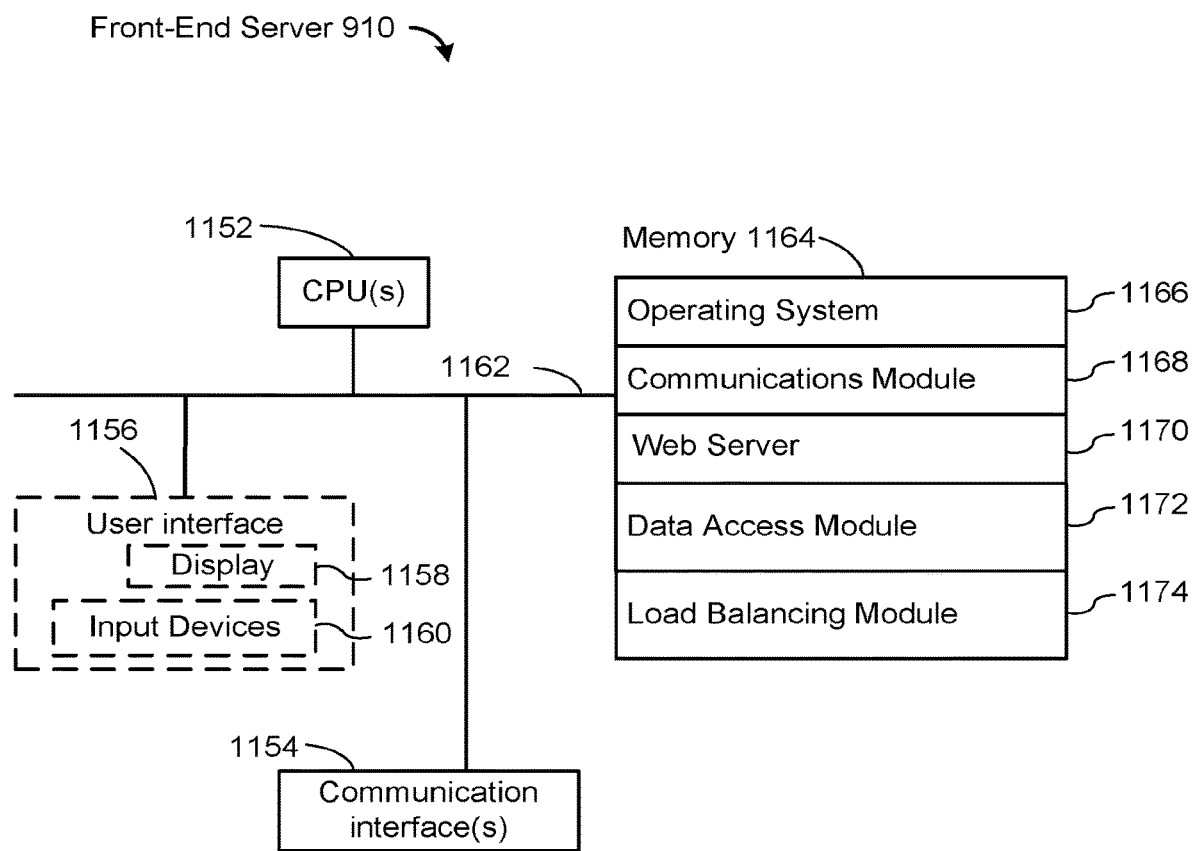
FIG. 11B is a functional block diagram of a front-end server in accordance with some embodiments.

Referring to FIG. 11B, a front-end server 910 generally includes one or more processing units (CPUs) 1152, one or more network or other communications interfaces 1154, memory 1164, and one or more communication buses 1162 for interconnecting these components. The communication buses 1162 may include circuitry (sometimes called a chipset) that interconnects and controls communications between system components. A front-end server 910 may optionally include a user interface 1156, for instance a display 1158 and a keyboard 1160. Memory 1164 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1164 may include mass storage that is remotely located from the central processing unit(s) 1162. Memory 1164, or alternately the non-volatile memory device(s) within memory 1164, comprises a computer readable storage medium. In some embodiments, memory 1164 or the computer readable storage medium of memory 1164 stores the following programs, modules and data structures, or a subset thereof:

- an operating system 1166 (e.g., LINUX or UNIX) that generally includes procedures for handling various basic system services and for performing hardware dependent tasks;
- a network communications module 1168 that is used for connecting the front-end server 910 to other servers or other computing devices via one or more communication networks 908, such as the Internet, other wide area networks, local area networks, metropolitan area networks, and the like;
- a web server 1170, which receives requests from clients for web pages or database access (reads or writes), and responds to those requests;
- a data access module 1172, which forwards data access requests from clients to an appropriate database server 922, and generates appropriate database access requests based on selected web pages; and
- a load balancing module 1174, which monitors the utilization of each of the database replicas, and directs new database access requests to an appropriate database server to even out the load among the database servers. In some embodiments, the load balancing module 1174 of the front-end server 910 balances the load among the replicas and the load among the database servers within each replica; in other embodiments, the load balancing module 1174 at the front end server 910 only balances load across the replicas. In these latter embodiments, load balancing for a replica is performed by one or more servers at the replica rather than the front end server 910.

FIG. 9 illustrates a single front-end server, but many embodiments include multiple front-end servers, such as 5, 20, or 50, depending on usage.

Although FIGS. 10, 11A, and 11B illustrate various client and server computers, these figures are intended more as functional illustrations of the various features that may be present in a single computer or set of servers, rather than a structural schematic of the embodiments described herein. In practice, and as recognized by those of ordinary skill in the art, items shown separately could be combined and some items could be separated. For example, some items shown separately in FIG. 9 (such as database server 922 and data store 932) could be implemented on a single server and single items could be implemented by one or more servers. The actual number of servers used to implement a database management system 950, and how features are allocated among them will vary from one embodiment to another, and may depend in part on the amount of data traffic that the system must handle during peak usage periods as well as during average usage periods.

Each of the methods described herein may be performed by instructions that are stored on a computer readable storage medium. The instructions are executed by one or more processors of one or more servers or clients. Each of the operations shown in FIGS. 10, 11A, and 11B may correspond to instructions stored in a computer memory or computer readable storage medium.

FIGS. 12A-12D illustrate exemplary data structures used in a multiversion database in accordance with some embodiments. FIG. 12A illustrates two rows 1216 and 1218 in a database table 1200. In an actual embodiment, a database table 1200 may contain millions or billions of rows. The illustrated database table 1200 has a Customer ID 1202 as the primary key. Each row has a distinct primary key value, such as the value 312257018 (1220) for the second row 1218. The database table 400 has several non-key columns, including Last Name 1204, First Name 1206, Address 1208, City 1210, State 1212, and Orders 1214. Each non-key column has a specific data type, which may be numeric, string, Boolean, date, or protocol buffer. In some embodiments, the data types for the non-key columns are specified in greater detail, such as single precision, double precision, or fixed decimal numeric types. String data types may be fixed length or variable length. A protocol buffer is a language-neutral, platform-neutral, extensible mechanism for serializing structured data—similar to XML, but smaller, faster, and simpler. A protocol buffer defines structured data, and can easily be written to or read from a variety of data streams using a variety of programming languages. In the illustrated database table, the first five non-key columns use a string data type (either fixed length or variable length depending on implementation). The Orders column 1214, however, has values that are themselves a table. For example, the row 1218 has subtable 1224 as the value for the Orders column 1214. As illustrated below in FIGS. 12C and 12D, subtables can be further nested.

Unlike an ordinary SQL database, an individual column of an individual row in a multiversion database comprises a set of values rather than a single value. For example, in the Address column 1208 of the row 1218 comprises a set of values 1222. This set of values 1222 is illustrated in FIG. 12B. Each Address Value 1228 has an associated Address Timestamp 1226, which specifies when the Address Value 1228 was written to the database table 1200. In the illustrated embodiment, timestamps are stored with an accuracy of 1/10000 of a second, but other embodiments have greater or lesser precision. FIG. 12B illustrates that the customer with Customer ID 312257018 (1220) has had three addresses, beginning with 123 Main St. (1232) as of Jan. 2, 2009 at about 1:12 PM (1230). This timestamp indicates when the address was saved in the database table 1200, not when the customer actually began living at 123 Main Street (1232). (The timestamps are not user entered "effective dates" that appear in some software applications.)

FIG. 12B illustrates that Customer 312257018 (1220) updated the address to 2388 First St. #12 (1236) on Sep. 15, 2011 about 6:15 PM (1234), and then updated the address to 9178 Sunset Avenue (1240) on Dec. 22, 2013 about 8:43 AM (1238). Any subsequent write to the Address column 408 for Customer 312257018 will have an Address Timestamp 1226 that is later than Dec. 22, 2013 at 8:43 AM (1238). This is described in more detail below with respect to FIGS. 13A, 13B, and 14A.

Having multiple versions of data allows a read in the past that sees the data as it was at that time. For example, a read of row 1218 for customer 322257018 at a read timestamp of Jan. 1, 2010 will return the Address Value 123 Main Street (1232), whereas a read of the same row at a read timestamp of Jan. 1, 2012 will return 2388 First St. #12 (1236). (Of course an actual read timestamp also specifies the time of day, but the time of day would not make a difference in the above two examples.) Due to storage space limits of the data store 932, old versions of column values are subject to garbage collection based on user-defined criteria. For example, entries can be subject to removal when the number of entries for a column exceeds a designated threshold or the entries are older than a threshold staleness.

As illustrated by the sequence of three values for the customer addresses for customer 312257018, the timestamps for the values create a unique order for the values. The database management system 950 guarantees that the timestamps for the values are monotonically increasing, even when new values are inserted in rapid succession.

Although the Database Management System 950 supports multiple versions for the values in non-key columns, multiple versions are not required. For example, people do not generally change their first names, and thus each customer row would typically have only a single value in the First Name column 1206. The timestamp for the single value in this instance would be the timestamp when the row was inserted.

As illustrated in FIG. 12C, The Orders column 1214 has values that are tables. FIG. 12C illustrates the subtable 1224 of orders for customer 312257018. In this illustration, the subtable 1224 has only two orders 1260 and 1262, but there can be any number of orders. The abbreviated subtable 1224 illustrated in FIG. 12C has four columns, including an Order ID 1250 as the primary key, and three non-key columns Order Date 1252, Shipping Address 1254, and Order Items 1256. Like the root table 1200, the values for the non-key columns have specified data types, which can be number, strings, dates, Boolean values, protocol buffers, or subtables.

Although Order Date 1252 and Shipping Address 1254 in the subtable 1224 can store multiple values, there would generally be a single value for each of these columns. However, additional values would be added if the customer corrects an invalid entry. For example, the customer might recognize that the shipping address 1266 for order QA1997233 (1264) was mistyped or used an old address. When the customer corrects the error, a new shipping address value would be added, but the previous value would still be in the set of values 1266. This also illustrates the point that a user cannot "change history." Once a value is saved, it will continue to exist in the database until some time later when it is removed by garbage collection.

The order QA1997233 (1264) includes a subtable 1268 that specifies the Order Items 1256 within the order. This illustrates that subtables may be nested inside other subtables. FIG. 12D illustrates an abbreviated set of columns to identify the items within subtable 1268. Similar to the root table 1200 and subtable 1224, the subtable 1268 has a primary key Item ID 1270, and some non-key columns. The non-key columns include a Quantity 1272 and Price 1274. FIG. 12D illustrates a subtable with two rows 1276 and 1278, but there could be any number of rows. In row 1278, the Item ID is 7752-81517 (1280), the Quantity is a value in the set of quantity values 1282, and the price is a value in the set of price values 1284. In general there would be a single value for the quantity 1282 and price 1284, but there would be multiple values if the data changed after it was originally saved. (E.g., the customer decides to get three of an item rather than two.)

Figure 12E:
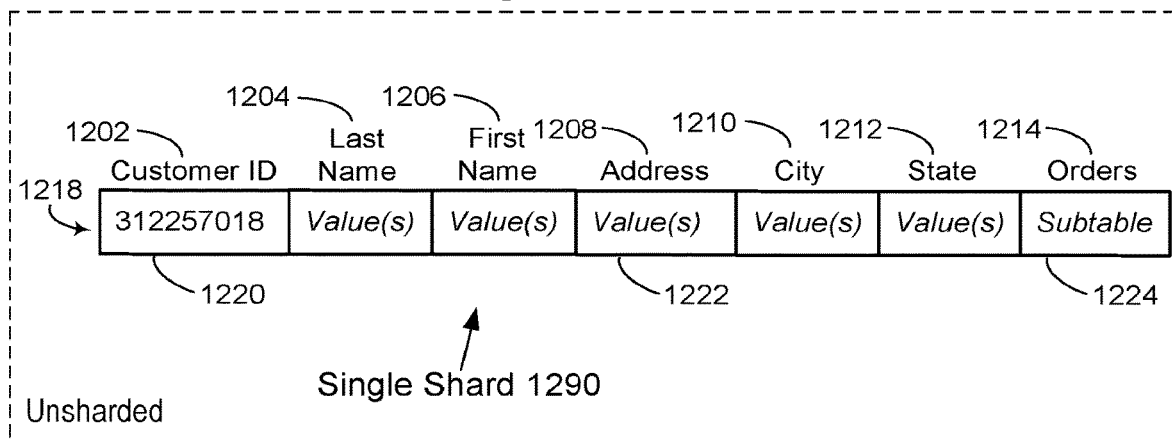
FIGS. 12E-12F illustrate sharding of a row in a database table in accordance with some embodiments.
Figure 12F:
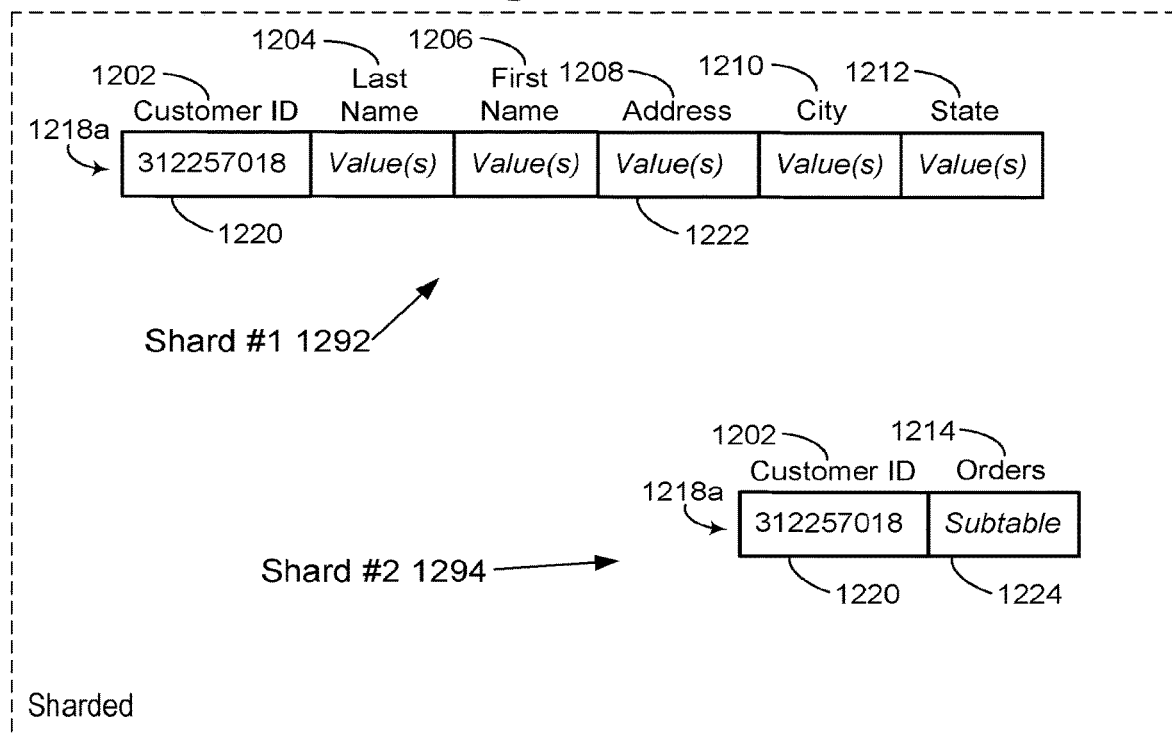

FIGS. 12E-12F illustrate sharding of a row in a database table in accordance with some embodiments. FIG. 12E illustrates a row 1218 of a database table 1200 that is saved as a single shard 1290. That is, the primary key 1202 and all of the non-key columns are stored together. As long as the total physical size of a row 1218 is not too large, the row consists of a single shard 1290. As used herein, a shard is also referred to as a "split." The threshold size for a single shard depends on implementation (e.g., the threshold size could be 10 Megabytes or 10 Gigabytes), and the threshold size is a "soft" limit. That is, a row 1218 can grow larger than the threshold size before it is sharded. Typically, most rows consist of a single shard.

FIG. 12F illustrates one way that a root row 1218 can be split into two shards 1292 and 1294. In this example, each shard includes the primary key Customer ID 1202, and a subset of the non-key columns. The non-key columns Last Name 1204, First Name 1206, Address 1208, City 1210, and State 1212 are included in the first shard 1292, and the non-key column Orders 1214 is included in the second shard 1294. In this example, each non-key column is included in exactly one shard, and the primary key is included in each of the shards. As illustrated in FIG. 12F, splitting into shards occurs on individual rows. Therefore, row 1218 may be split into a portion 1218a in a first shard 1292 and a second portion 1218b in a second shard 1294, whereas row 1216 (see FIG. 12A) may remain as a single shard.

Figure 12G:
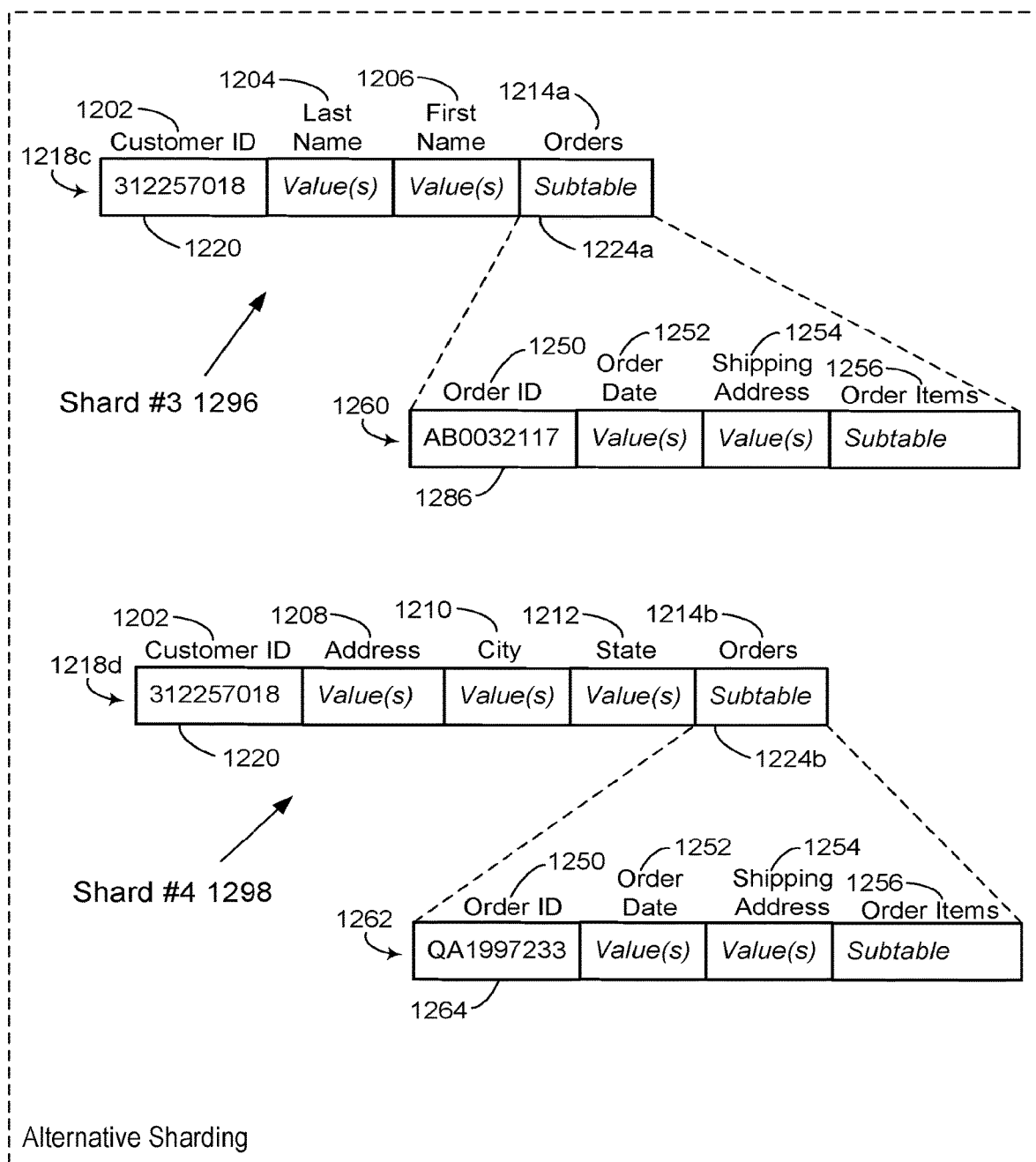
FIG. 12G illustrates an alternative way to split a row 418 into shards in accordance with some embodiments.

FIG. 12G illustrates an alternative way to split a row 1218 into shards 1296 and 1298 when the row includes one or more non-key columns that are subtables. One shard 1296 includes a portion 1218c of the original row 1218, which includes the primary key Custom ID 1202, two non-key columns Last Name 1204 and First Name 1206, as well as a portion 1214a of the Orders subtable that contains a subset 1224a of the rows of the subtable 1224 from the original row 1218. In particular, the subset 1224a includes order AB0032117 (1286). Another shard 1298 includes a portion 1218d of the original row 1218, which includes the primary key Custom ID 1202, three non-key columns Address 1208, City 1210, and State 1212, as well as a portion 1214b of the Orders subtable that contains a subset 1224b of the rows of the subtable 1224 from the original row. In particular, the subset 1224b includes order QA1997233 (1264). In this alternative sharding method, ordinary non-key columns are relocated to exactly one of the shards, but a non-key column that is a subtable may have the rows of the subtable split among the shards.

FIG. 13A illustrates a data structure that some embodiments use for selecting read timestamps and write timestamps. This data structure includes the timestamp for the last write of each column. The data row 1318 illustrated corresponds to database table row 1218 in FIG. 12E. In some embodiments, this data is stored in persistent storage in data store 932 or in memory 1114, whereas in other embodiments, this information is computed when needed based on the timestamps associated with the column values in each column. The Customer ID 1202 correlates this data with the appropriate customer. The actual data structure includes "last-write" timestamps for each non-key column of the database table 1200, but FIG. 13A illustrates just two of them. The [First Name] Last Write 1306 indicates the timestamp of the last write to the First Name column 1206. The [Address] Last Write 1308 indicates the timestamp of the last write to the Address column 1208. Based on the three column values illustrated in FIG. 12B and their associated timestamps, the last write was Dec. 22, 2013 at 8:43 AM (plus 29.8293 seconds to be precise). Comparing the [Address] Last Write 1308 in FIG. 13A to the data in FIG. 12B illustrates that the last-write data for each column can be calculated (e.g., select the highest timestamp associated with the column values); however, when the overhead cost in time and space for storing this redundant information is small, some embodiments store the data in permanent storage or store the data in memory 1114.

As FIG. 13A illustrates, the last-write timestamp is known for each column in the database table 1200. This granularity enables selection of read and write timestamps without blocking other transactions that access different columns of the same row.

FIG. 13B illustrates a piece of data 1320 that is used by the database management system 950 to ensure that the timestamps for write transactions are monotonically increasing. The Minimum Next New Write Timestamp (MNNWT) 1320 is tracked for each database or database replica. When the next write transaction arrives, it is assigned a write timestamp that is greater than or equal to MNNWT 1320.

When a database server receives a read request, the read is assigned a timestamp that is greater than last-write timestamp of the accessed columns and less than MNNWT 1320. This serializes the read after the last write and before the next new write. The read can proceed in parallel with any new writes that are received by the database server because the database maintains multiple versions of column values; the read accesses the existing data, and any new writes will create new versions of data with timestamps greater than or equal to MNNWT.

When the database server receives a write request, the write transaction is assigned a timestamp greater than or equal to MNNWT (typically greater than) and increases MNNWT to be greater than the assigned timestamp.

When a client computer 902 needs to perform a read at a time that is consistent across multiple database servers, the client 902 may specify a read timestamp. As long as that timestamp is less than the MNNWT 1320 of each database server, the read may safely proceed at each database server, and the read results are guaranteed to be stable if the read is repeated at the same timestamp.

In some embodiments, there are one or more database replicas (e.g., replica 916) that are capable of serving writes but not reads or vice versa. In some of these embodiments, the limited replica periodically receives a MNNWT value from another replica. A replica with knowledge of MNNWT may independently serve a read at a timestamp less than MNNWT without having to communicate with other database servers. In the absence of writes, a database server periodically increases the value of MNNWT so that replica entities may serve reads at increasing timestamps.

Figure 14A:
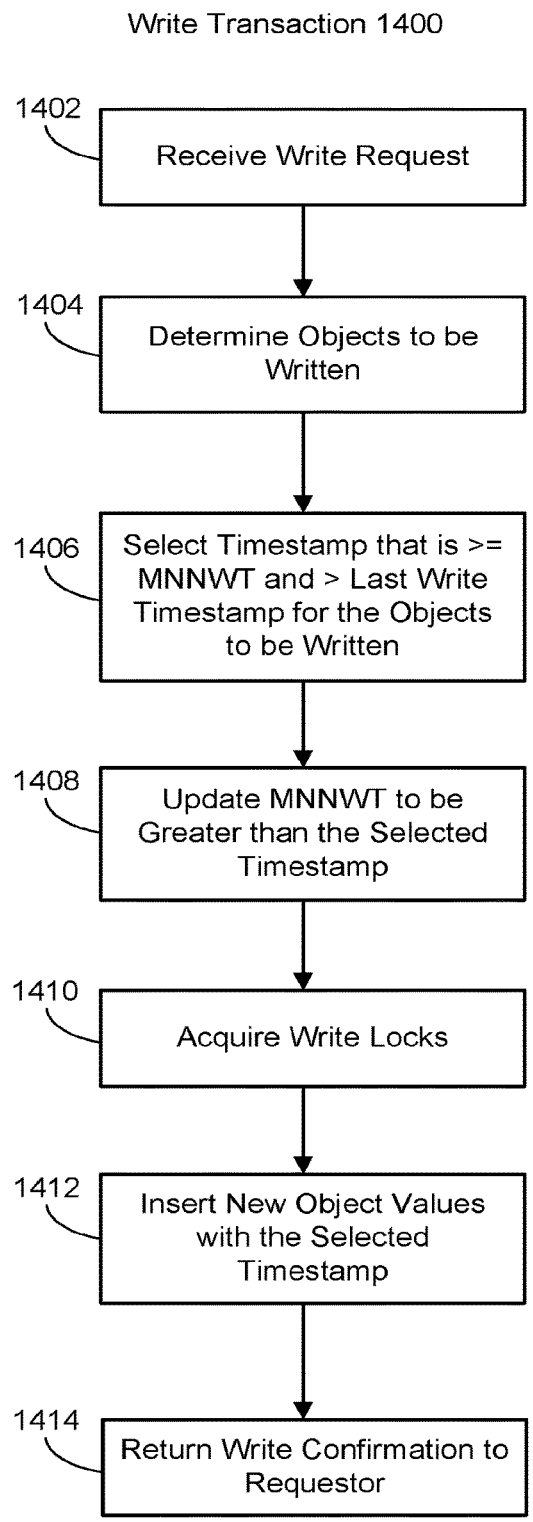
FIGS. 14A-14B are exemplary flowcharts for reading and writing data from a table in a multiversion database in accordance with some embodiments.
Figure 14B:
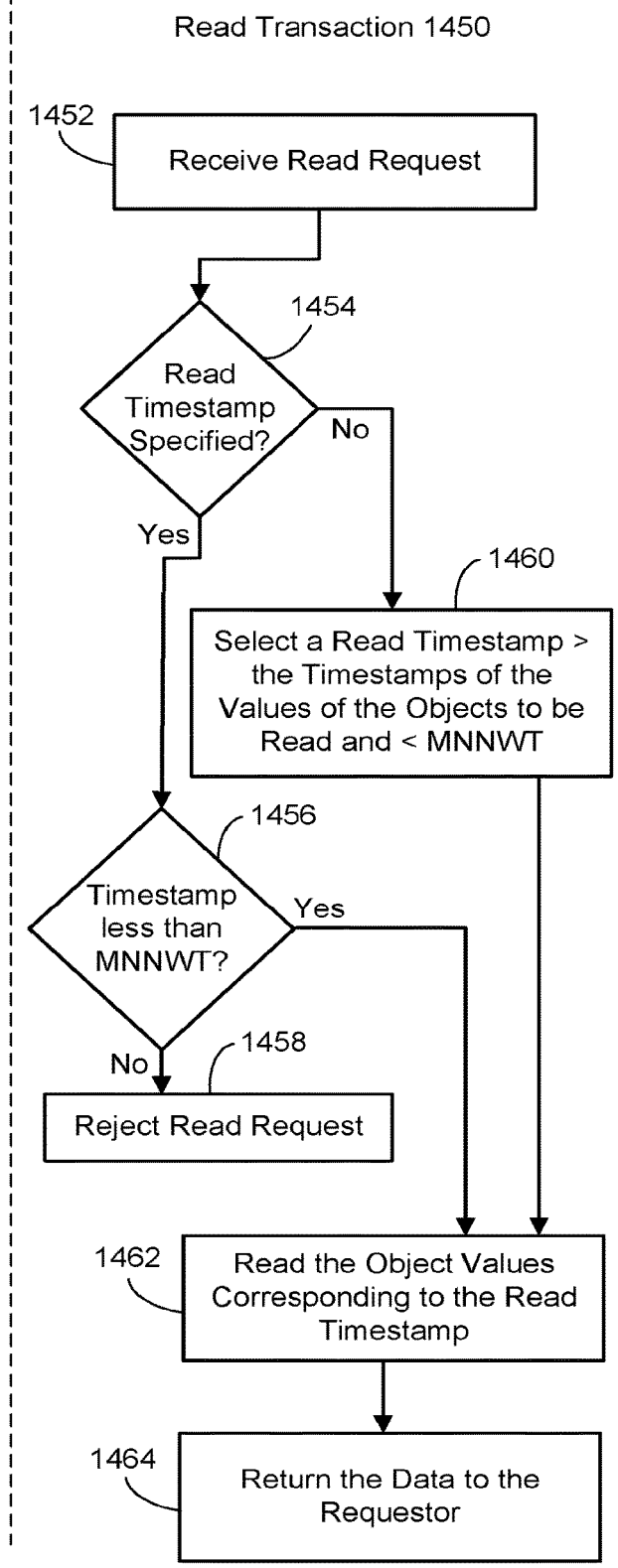

FIGS. 14A and 14B are exemplary flowcharts that summarize the relevant aspects of read and write transactions. In FIG. 14A, the database management system 950 receives (1402) a write transaction 1400. A database server determines (1404) what objects need to be written (e.g., columns of a row in a database table). The database server then selects (1406) a write timestamp that is greater than or equal to MNNWT 1320 and that is greater than the last write timestamp for the objects to be written. Some embodiments omit the second check because the MNNWT 1320 should always be greater than any previous write timestamps. The database server updates (1408) MNNWT 1320 so that MNNWT is greater than the timestamp just selected. The database server acquires (1410) write locks on the objects to be written, then inserts (1412) new object values with the selected timestamp into the set of object values. The database server then returns (1414) a write confirmation to the client computer 902 that initiated the write transaction 1400.

FIG. 14B illustrates a read transaction 1450. The database management system 950 receives (1452) the read request, and determines (1454) whether the read request specifies a read timestamp. If the read request does include a read timestamp, the database management system 950 determines (1456) whether the specified timestamp is less than MNNWT. If the specified read timestamp is greater than or equal to MNNWT 1320, some embodiments reject (1458) the request. In other embodiments, when the specified read timestamp is greater than or equal to MNNWT 1320, the read transaction 1450 will block until MNNWT 1320 is increased.

If the read request does not include a read timestamp, the database management system 950 selects (1460) a read timestamp that is greater than the last-write timestamp of the values of the objects to be read and that is less than MNNWT 1320. MNNWT 1320 is guaranteed to be greater than all of the timestamps of the previous writes, so it is always possible to select a read timestamp meeting these criteria.

Whether the read timestamp is specified by the client 902 or selected by the database management system 950, a database server proceeds to read (1462) the desired data at the specified timestamp and returns (1464) the data to the client 902.

Figure 15:
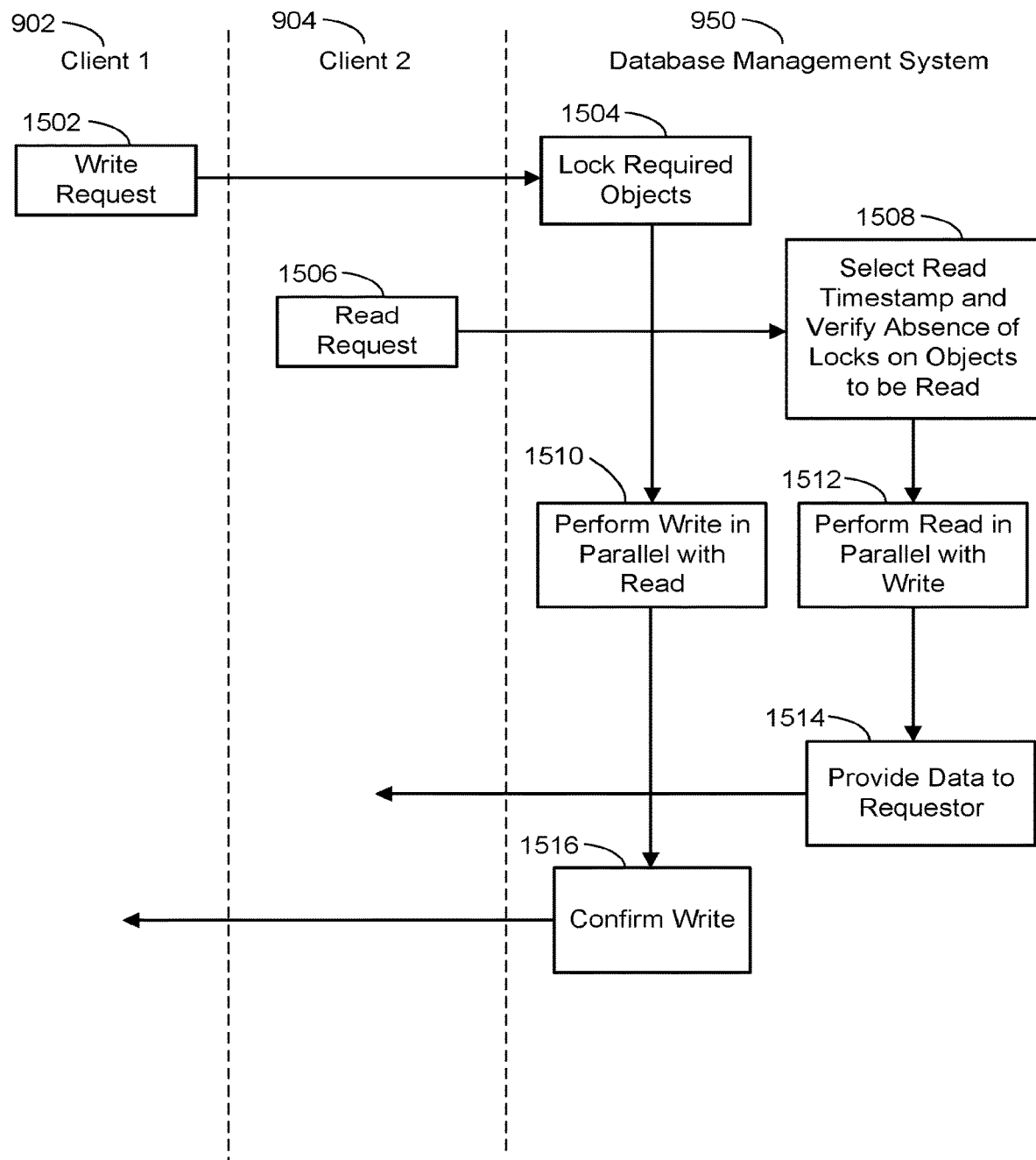
FIG. 15 is an exemplary flowchart for simultaneously reading and writing data from a table in a multiversion database in accordance with some embodiments.

FIG. 15 is a high level view of the operations performed at a server when a write transaction and a read transaction access the same database table row at approximately the same time. In this illustration, the read and write transaction are received from two distinct client computers 902 and 904, but the two transactions could easily originate from the same client 902. For example, a graphical user interface at a client may issue a write, then issue an immediate read so that the interface is refreshed with the current data. As another example, the two requests may be issued by independent asynchronous processes. Furthermore, essentially the same description would apply if the read transaction were received before the write transaction, there were two nearly simultaneous read transactions, or two nearly simultaneous write transactions. In this example, the write request 1502 is received by the database management system 950 before the database management system 950 receives the read request 1506. If the read request 1506 seeks to read any of the objects that the write request is going to modify, then there is an inherent conflict, and the read will have to wait until the write is complete. Therefore, FIG. 15 represents read and write transactions that do not have an inherent conflict.

The database server 922 processing the write transaction locks (1504) the appropriate object and proceeds with the write. This is described in more detail above with respect to FIG. 14A. In this illustration, the read request 1506 is received a moment after the database management system 950 receives the write request. As illustrated in FIG. 14B, a database server selects (1508) a read timestamp and verifies (1508) that there are no locks on the objects to be read. Then the database server performs (1510) the write in parallel with the read, and performs (1512) the read in parallel with the write. In this illustration, the read completes first and provides (1514) the read data to the requestor. Afterwards the database server completes the write and confirms (1516) the write with the write requestor. In some instances the write request would complete prior to completion of the read.

Figure 16A:
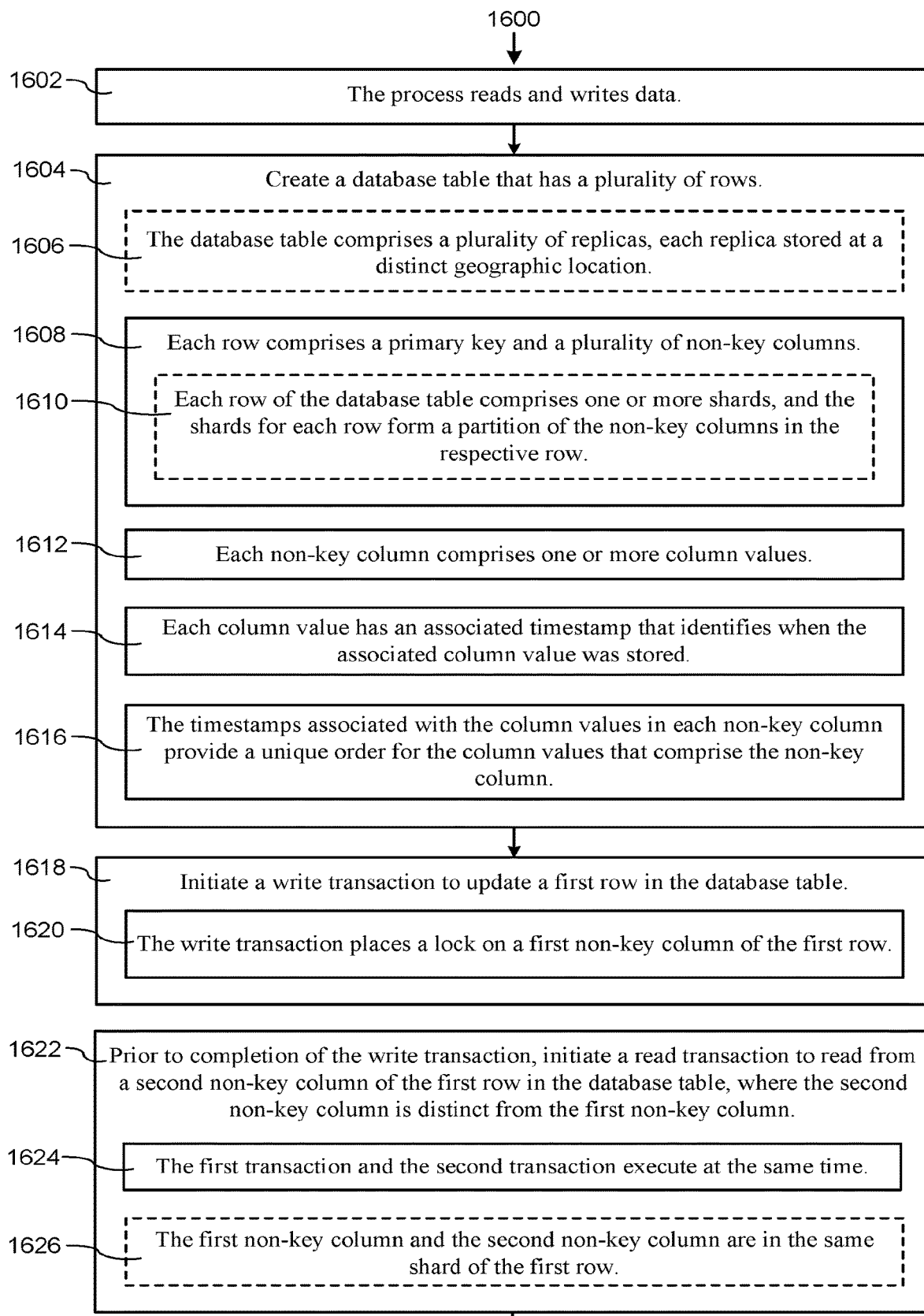
FIGS. 16A-16B illustrate an exemplary process for reading and writing data from a table in a multiversion database according to some embodiments.
Figure 16B:
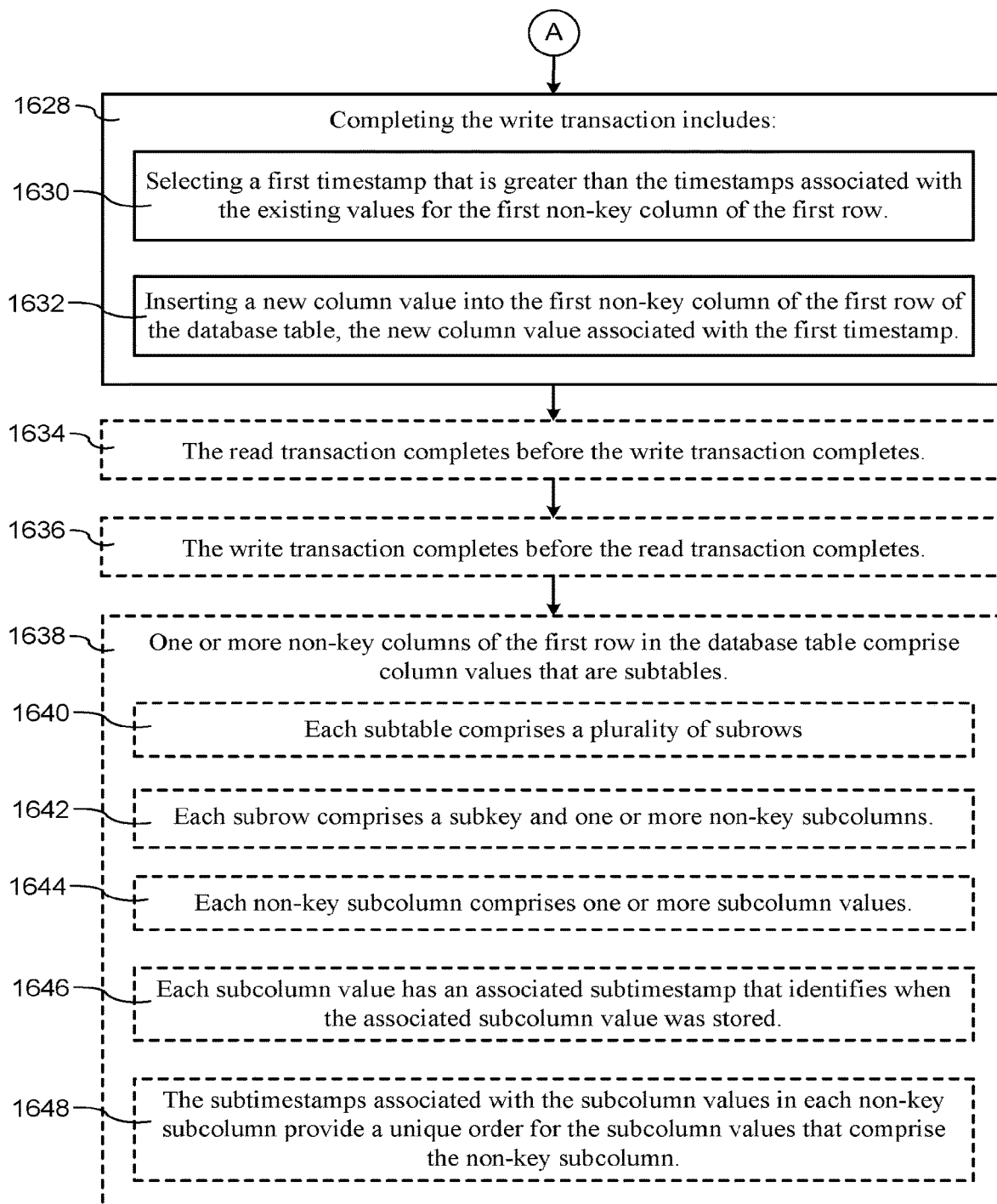

FIGS. 16A-16B illustrate an exemplary process 1600 that reads (1602) and writes (1602) data in a multiversion database. The process 1600 is performed by a database management system 950, which includes one or more servers, each having one or more processors and memory. In process 1600, the system 950 creates (1604) a database table 1200 that has a plurality of rows. In some embodiments, the database table 1200 comprises (1606) a plurality of replicas, each replica stored at a distinct geographic location. The table replicas are part of the database replicas 912, 914, and 916 identified in FIG. 9. That is, a replica of a database table would be located at a database replica, such as replica 912.

Each row of the database table comprises (1608) a primary key, which uniquely identifies the row, and a plurality of non-key columns. In some embodiments, each of the rows of the database table comprises (1610) one or more shards. This was described in greater detail above with respect to FIGS. 12E-12G. In some embodiments, the shards for each row form (1610) a partition of the non-key columns in the respective row. In some embodiments, the shards for each row form a partition of the non-key columns whose values are not subtables. This is described in greater detail above with respect to FIGS. 12E-12G.

As described in greater detail above with respect to FIG. 12B, each non-key column has (1612) one or more column values. Each column value has (1614) an associated timestamp that identifies when the associated column value was stored. This enables the database management system 950 to read data from the database table 1200 as it appeared at any point in the past. The timestamps associated with the column values in each non-key column provide (1616) a unique order for the column values that comprise the non-key column. When a new column value is inserted, its associated timestamp represents when the new column value is stored, and thus the associated timestamp is greater than all of the previous timestamps for the previously existing column values for the same column.

The process 1600 initiates (1618) a write transaction to update a first row in the database table 1200. In some embodiments, a single write transaction can update a plurality of root rows. The write transaction places (1620) a lock on a first non-key column of the first row. This first non-key column represents a column that the write transaction will update.

Prior to completion of the write transaction, the process 1600 initiates (1622) a read transaction to read from a second non-key column of the first row in the database table 1200. The second non-key column is (1622) distinct from the first non-key column. Because the timestamps are stored for each individual non-key column, and the columns accessed by the read and write transactions are distinct, they do not block each other. Therefore, the first transaction and the second transaction execute (1624) at the same time. In embodiments where database tables 1200 can be sharded, the first and second non-key columns can be (1626) in the same shard of the first row, or can be (1626) in different shards of the first row.

Completing the write transaction includes (1628): selecting (1630) a first timestamp that is greater than the timestamps associated with the existing values for the first non-key column of the first row; and inserting (1632) a new column value into the first non-key column of the first row of the database table 1200. The new column value is associated (1632) with the first timestamp.

In some instances, the read transaction completes (1634) before the write transaction completes. In other instances, the write transaction completes (1636) before the read transaction completes.

In some instances, the first row of the root database table 1200 includes (1638) one or more non-key columns that comprise column values that are subtables. Each subtable comprises (1640) a plurality of subrows (i.e., rows of the subtable). Each subrow comprises (1642) a subkey that uniquely identifies the subrow within the subtable and one or more non-key subcolumns (i.e., a column within the subtable). Each non-key subcolumn comprises (1644) one or more subcolumn values (i.e., values for the subcolumn). Furthermore, each subcolumn value has (1646) an associated subtimestamp that identifies when the associated subcolumn value was stored in the database. The subtimestamps associated with the subcolumn values in each non-key subcolumn provide (1648) a unique order for the subcolumn values that comprise the non-key subcolumn.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of maintaining concurrency, comprising:
   initiating a write transaction for a first object in a row of a database table, the database table having a plurality of rows;
   locking, with one or more processors, the first object without locking other objects in the row;
   receiving, with one or more processors, a read request for a second object in the row; and
   reading, with one or more processors, the second object in the row while the write transaction holds a lock on the first object, wherein reading the second object is performed prior to completion of the write transaction for the first object.

2. The method of claim 1, further comprising associating with each object in the row a write indicator of when the respective object was last written.

3. The method of claim 2, wherein the write indicator is a monotonically increasing value.

4. The method of claim 3, wherein the monotonically increasing value increases with each write transaction.

5. The method of claim 3, wherein a read indicator is assigned to the reading of the second object in response to the read request.

6. The method of claim 5, wherein the read indicator is a value that is greater than the write indicator associated with the second object.

7. The method of claim 3, further comprising prohibiting editing of objects corresponding to prior write indicator values.

8. The method of claim 1, wherein the write transaction is received at a database replica, and wherein the database replica independently serves the write transaction without having to communicate with other database servers.

9. The method of claim 1, wherein the first object and second object are in a same shard of the first row.

10. A system for maintaining concurrency, comprising:
- memory storing a database table having a plurality of rows; and
- one or more processors in communication with the memory, the one or more processor configured to:
  - initiate a write transaction for a first object in a row of a database table, the database table having a plurality of rows;
  - lock the first object without locking other objects in the row;
  - receive a read request for a second object in the row; and
  - read the second object in the row while the write transaction holds a lock on the first object, wherein reading the second object is performed prior to completion of the write transaction for the first object.

11. The system of claim 10, wherein the one or more processors are further configured to associate with each object in the row a write indicator of when the respective object was last written.

12. The system of claim 11, wherein the write indicator is a monotonically increasing value.

13. The system of claim 12, wherein the monotonically increasing value increases with each write transaction.

14. The system of claim 12, wherein a read indicator is assigned to the reading of the second object in response to the read request.

15. The system of claim 14, wherein the read indicator is a value that is greater than the write indicator associated with the second object.

16. The system of claim 12, wherein the one or more processors are further configured to prohibit editing of objects corresponding to prior write indicator values.

17. The system of claim 10, wherein the write transaction is received at a database replica, and wherein the database replica independently serves the write transaction without having to communicate with other database servers.

18. The system of claim 10, wherein the first object and second object are in a same shard of the first row.

* * * * *